US012088451B2

(12) United States Patent
Gatherer et al.

(10) Patent No.: US 12,088,451 B2
(45) Date of Patent: *Sep. 10, 2024

(54) CROSS-PLATFORM PROGRAMMABLE NETWORK COMMUNICATION

(71) Applicant: Cirrus360 LLC, Richardson, TX (US)

(72) Inventors: Alan Gatherer, Dallas, TX (US); Chaitali Sengupta, Richardson, TX (US); Sudipta Sen, Richardson, TX (US)

(73) Assignee: Cirrus360 LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,235

(22) Filed: Jun. 6, 2023

(65) Prior Publication Data
US 2023/0318904 A1 Oct. 5, 2023

Related U.S. Application Data

(63) Continuation of application No. 17/339,800, filed on Jun. 4, 2021, now Pat. No. 11,743,102.
(Continued)

(51) Int. Cl.
H04L 41/5067 (2022.01)
H04L 41/0246 (2022.01)
(Continued)

(52) U.S. Cl.
CPC ........ H04L 41/052 (2022.05); H04L 41/0246 (2013.01); H04L 41/16 (2013.01); H04W 88/18 (2013.01); H04W 92/02 (2013.01)

(58) Field of Classification Search
None
See application file for complete search history.

(56) References Cited

U.S. PATENT DOCUMENTS 10,102,372 B2 10/2018 Huang et al.
10,862,796 B1 12/2020 Dickinson et al.
(Continued)

FOREIGN PATENT DOCUMENTS

WO WO-2014169062 A1 * 10/2014 ........... G06F 21/552

OTHER PUBLICATIONS

Bogucka, H., et al. Balancing Explosive Growth with Dramatic Energy Efficiency Improvements: The Necessity for A Green Revolution in 5G and Beyond. IEEE CTN. Sep. 2020. Retrieved from https://www.comsoc.org/publications/ctn/balancing-explosive-growth-dramatic-energy-efficiency-improvements-necessity-green. 19 pgs.
(Continued)

Primary Examiner — Ajit Patel
(74) Attorney, Agent, or Firm — McDermott Will & Emery LLP

(57) ABSTRACT

Various aspects of the subject technology relate to systems, methods, and machine-readable media for cross-platform programmable network communication. The method includes receiving, at a network toolchain, instructions for network hardware of a radio access network (RAN), the instructions comprising a domain specific language for the RAN. The method also includes determining through the network toolchain an architectural model for the network hardware, the architectural model comprising network patterns of the network hardware. The method also includes generating, by the network toolchain, translated instructions based on the instructions, the translated instructions comprising a configuration and control layer (CCL) code. The method also includes sending the CCL code to the network hardware. The method also includes executing the CCL code by the network hardware. The method also includes causing the network hardware to perform a network function based on execution of the CCL code.

20 Claims, 11 Drawing Sheets

Related U.S. Application Data

(60) Provisional application No. 63/113,607, filed on Nov. 13, 2020, provisional application No. 63/036,422, filed on Jun. 8, 2020.

(51) Int. Cl.
*H04L 41/052* (2022.01)
*H04L 41/14* (2022.01)
*H04L 41/16* (2022.01)
*H04W 88/18* (2009.01)
*H04W 92/02* (2009.01)

(56) References Cited

U.S. PATENT DOCUMENTS

| | | | |
|---|---|---|---|
| 11,373,119 | B1 | 6/2022 | Doshi et al. |
| 2019/0228261 | A1 | 7/2019 | Chan |
| 2020/0145358 | A1 | 5/2020 | Yegorin et al. |
| 2020/0193221 | A1* | 6/2020 | Aftab ............... G06N 3/08 |
| 2020/0301761 | A1 | 9/2020 | Bharti et al. |
| 2022/0109515 | A1 | 4/2022 | Chervyakov et al. |

OTHER PUBLICATIONS

Coskun, Ayse K., et al. Evaluating the Impact of Job Scheduling and Power Management on Processor Lifetime for Chip Multiprocessors. Sigmetrics/Performance 2009, Jun. 15-19, 2009, Seattle, WA—Retrieved from https://www.bu.edu/peaclab/files/2014/03/coskun_SIGMETRICS09.pdf on May 13, 2021, 12 pgs.

Gatherer, A., et al. Software Defined Radio: Baseband Technologies for 3G Handsets and Basestations (Ed. Wiley)—Chapter 7: Cost Effective Software Radio for CDMA Systems. Wiley Online Library. Dec. 19, 2003 (print)—14 pgs.

Hennessey, J. et al., A New Golden Age for Computer Architecture. Domain-Specific Hardware/Software Co-Design, Enhanced Security, Open Instruction Sets, and Agile Chip Development—Communications of the ACM, Jan. 2019 https://doi.org/10.1145/3282307—13 pgs.

Kubiatowicz, John., et al., Tessellation OS. A real-time, responsive, high-throughput client operating system for ManyCore. UC Berkeley Home page retrieved from https://tessellation.cs.berkeley.edu/ on May 13, 2021, 1 page.

Lee, Edward A., Introduction to Lingua Franca, a Meta Language for Real-Time Systems. Universite Paris-Saclay, France—Univ. of CA at Berkeley, Jan. 31, 2020, retrieved from https://ptolemy.berkeley.edu/~eal/presentations/Lee_LinguaFranca_Saclay.pdf on May 13, 2021, 111 pgs.

Lohstroh, M. et al. Deterministic Actors. (Sep. 2019) retrieved from https://people.eecs.berkeley.edu/~marten/pdf/Lohstroh_Lee_FDL19.pdf on May 24, 2021, pp. 1-8.

Panasik C., et al. The Application of Programmable DSPs in Mobile Communications (Ed. Gatherer)—Chapter 6—The Challenges of Software-Defined Radio. Texas Instruments Inc., John Wiley & Sons Ltd., Retrieved from https://fmipa.umri.ac.id/wp-content/uploads/2016/03/Alan-Gatherer-Edgar-Auslander-the-application-of-programmable-dsps-in-mobile-communications.9780471486435.45324.pdf on May 13, 2021, 36 pgs.

Prabhakar, R., et al., Generating Configurable Hardware from Parallel Patterns. Stanford University. ASPLOS '16 (Apr. 2-6, 2016) Atlanta, GA; retrieved from https://ppl.stanford.edu/papers/asplos16-prabhakar.pdf on May 13, 2021. 15 pgs.

Sampson, A., et al. "Enerj: approximate data types for safe and general low-power computation." in PLDI, M. W. Hall and D. A. Padua, Eds. ACM, 2011, pp. 164-174. Retrieved from: https://dl.acm.org/doi/10.1145/1993498.1993518.

Wikipedia, "First-order logic," 2021, [Online; accessed Feb. 9, 2021]. [Online]. retrieved on May 24, 2021 from https://en.wikipedia.org/wiki/First-order logic, 26 pgs.

\* cited by examiner

CROSS-PLATFORM PROGRAMMABLE NETWORK COMMUNICATION

CROSS-REFERENCE TO RELATED APPLICATIONS

This present application claims the benefit of priority under 35 U.S.C. 120 as a continuation of U.S. patent application Ser. No. 17/339,800, filed Jun. 4, 2021, now allowed, which claims the benefit of U.S. Provisional Application No. 63/036,422 filed on Jun. 8, 2020, and U.S. Provisional Application No. 63/113,607 filed on Nov. 13, 2020, the disclosures of which are hereby incorporated by reference in its entirety for all purposes.

TECHNICAL FIELD

The present disclosure generally relates to radio access networks (RANs), and more particularly to cross platform programmable network communication for RANs.

BACKGROUND

Infrastructure costs for the telecommunications industry have been exploding as the industry moves to 5G wireless technology, and beyond. Of these costs, radio access network (RAN) costs are the highest. The RAN also consumes the most power of all the other telecommunications infrastructure elements. The cost drivers are not only the bill of materials for the infrastructure, but also the direct and indirect costs of development, maintenance, time-to-market, and upgrade flexibility of telecommunications products. The telecommunications industry has attempted to address this issue with a massive move to adopt innovate software solutions, dis-aggregated architectures, and off-the-shelf hardware. However, there are several technical challenges that must be addressed to make such concepts successful. Therefore, there is a need for a solution that addresses these problems in the context of an evolving and complex 5G standard.

BRIEF SUMMARY

The subject disclosure provides for systems, methods, and machine-readable media for an open, real time, high reliability, white box Radio Access Network (RAN) Layer 1 platform that disaggregates hardware and software, algorithms and implementation, across an open RAN RU (Radio Unit), DU (Distributed Unit), and CU (Centralized Unit). The disclosed solutions enrich the telecommunications ecosystem that is available to operators in a field-supportable manner.

According to one embodiment of the present disclosure, a computer-implemented method for cross-platform programmable network communication is provided. The method includes receiving, at a network toolchain, instructions for network hardware of a radio access network (RAN), the instructions comprising a domain specific language for the RAN. The method also includes determining through the network toolchain an architectural model for the network hardware, the architectural model comprising network patterns of the network hardware. The method also includes generating, by the network toolchain, translated instructions based on the instructions, the translated instructions comprising a configuration and control layer (CCL) code. The method also includes sending the CCL code to the network hardware. The method also includes executing the CCL code by the network hardware. The method also includes causing the network hardware to perform a network function based on execution of the CCL code.

According to one embodiment of the present disclosure, a system is provided including a processor and a memory comprising instructions stored thereon, which when executed by the processor, causes the processor to perform a method for cross-platform programmable network communication. The method includes receiving, at a network toolchain, instructions for network hardware of a radio access network (RAN), the instructions comprising a domain specific language for the RAN. The method also includes determining through the network toolchain an architectural model for the network hardware, the architectural model comprising network patterns of the network hardware. The method also includes generating, by the network toolchain, translated instructions based on the instructions, the translated instructions comprising a configuration and control layer (CCL) code. The method also includes sending the CCL code to the network hardware. The method also includes executing the CCL code by the network hardware. The method also includes causing the network hardware to perform a network function based on execution of the CCL code.

According to one embodiment of the present disclosure, a non-transitory computer-readable storage medium is provided including instructions (e.g., stored sequences of instructions) that, when executed by a processor, cause the processor to perform a method for cross-platform programmable network communication. The method includes receiving, at a network toolchain, instructions for network hardware of a radio access network (RAN), the instructions comprising a domain specific language for the RAN. The method also includes determining through the network toolchain an architectural model for the network hardware, the architectural model comprising network patterns of the network hardware. The method also includes generating, by the network toolchain, translated instructions based on the instructions, the translated instructions comprising a configuration and control layer (CCL) code. The method also includes sending the CCL code to the network hardware. The method also includes executing the CCL code by the network hardware. The method also includes causing the network hardware to perform a network function based on execution of the CCL code.

According to one embodiment of the present disclosure, a system is provided that includes means for storing instructions, and means for executing the stored instructions that, when executed by the means, cause the means to perform a method for cross-platform programmable network communication. The method includes receiving, at a network toolchain, instructions for network hardware of a radio access network (RAN), the instructions comprising a domain specific language for the RAN. The method also includes determining through the network toolchain an architectural model for the network hardware, the architectural model comprising network patterns of the network hardware. The method also includes generating, by the network toolchain, translated instructions based on the instructions, the translated instructions comprising a configuration and control layer (CCL) code. The method also includes sending the CCL code to the network hardware. The method also includes executing the CCL code by the network hardware. The method also includes causing the network hardware to perform a network function based on execution of the CCL code.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
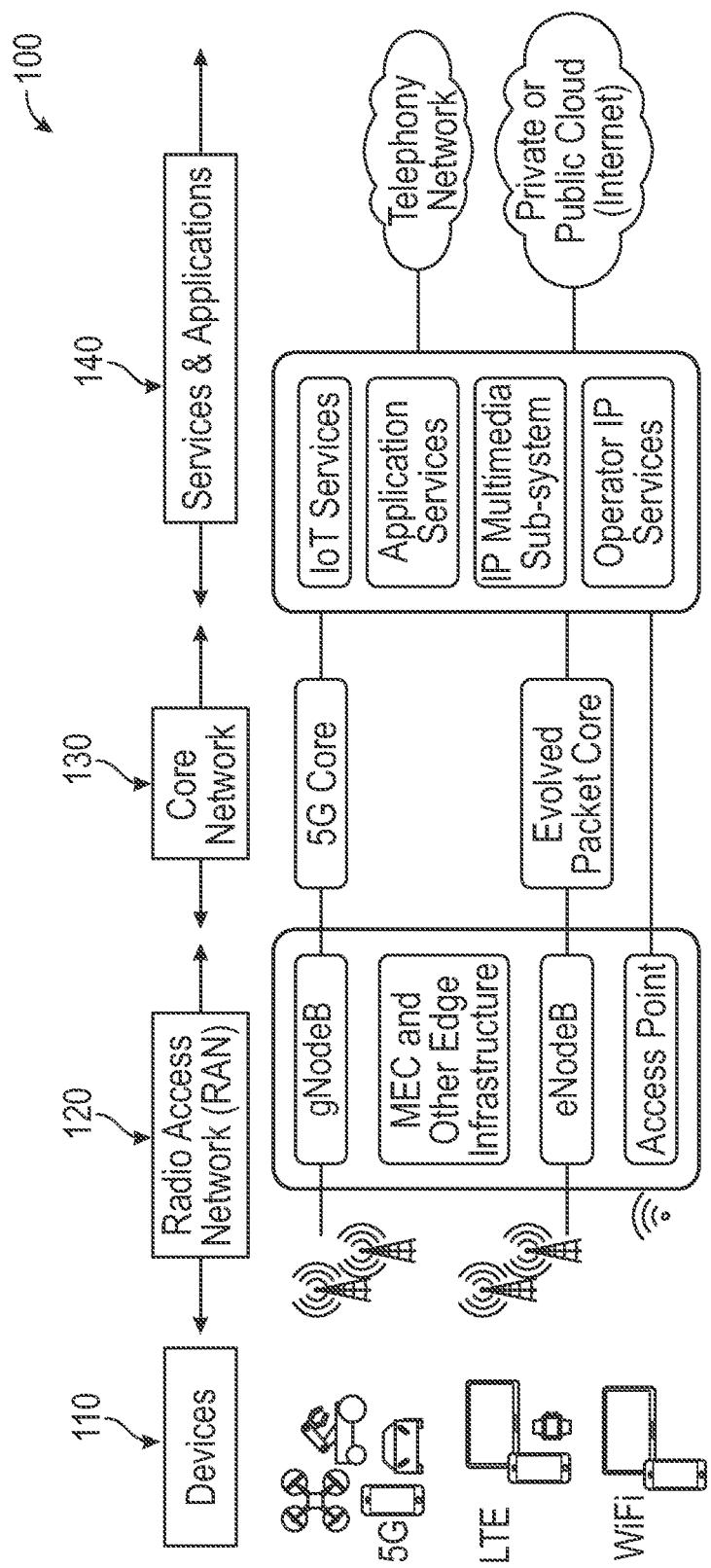
FIG. 1 illustrates an exemplary telecommunications infrastructure, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Infrastructure costs for the telecommunications industry have been exploding as the industry moves to 5G wireless technology, and beyond. Of these costs, radio access network (RAN) costs are the highest. The RAN also consumes the most power of all the other telecommunications infrastructure elements. The cost drivers are not only the bill of materials for the infrastructure, but also the direct and indirect costs of development, maintenance, time-to-market, and upgrade flexibility of telecommunications products. The telecommunications industry has attempted to address this issue with a massive move to adopt innovate software solutions, dis-aggregated architectures, and off-the-shelf hardware, which include the Cloud RAN, Virtualized RAN, and open RAN movements. However, there are several technical challenges that must be addressed to make such concepts successful.

For open RAN to be a success, operators require competition and differentiation in the RAN, but equally important, are network reliability and agile responses to bugs and performance issues that the traditional suppliers provide. As a result, a new breed of telecommunications network software companies are transforming the 5G RAN industry with innovative software and differentiating algorithms. However, innovations in software and algorithms must go hand-in-hand with system level performance that meets real time requirement with reliability, robustness against Heisenbugs, and optimized time to market. Fully virtualizing the RAN Layer 1 (L1) without compromising power and performance, especially for the open RAN Distributed Unit (DU) is a challenge, as it requires guarantees from the underlying hardware platform as well as the appropriate low level software.

Three industry trends have attempted to address the above challenges in last 5 years, namely, Cloud RAN (C-RAN), Virtualized RAN (vRAN), and Open RAN (O-RAN). Specifically, C-RAN attempts to provide for resource sharing on commercial off the shelf hardware, vRAN attempts to provide for network agility and faster time to market, and O-RAN (e.g., the Telecommunications Infrastructure Project (TIP) and O-RAN alliance) attempts to dis-aggregate RAN to enable new entrants into the field.

Unfortunately, there have been many obstacles to successful O-RAN deployment so far. For example, O-RAN requires strict real time constraints in the range of microseconds and milliseconds for multiple and dynamic sets of tasks. There is also flexibility needed for scalability for various deployments, such as macro dense urban, macro rural, small cells, private, and the like, and corresponding ranges of services for each deployment (e.g., augmented reality (AR), virtual reality (VR), internet of things (IoT), video, drones, industrial internet of things (IIoT), etc.). Additional issues include security, determinism, and testability, of the network, minimization of random crashes on average must be less than once over the lifetime, and the system must be zero touch to minimize the expenses of having technicians fix errors. These are difficult problems that conventional solutions have failed to adequately address.

The current industry approach to implementing O-RAN utilizes x86 ARM processors plus Field Programmable Gate Array (FPGA) accelerators. As stated above, the difficulty in implementing the RAN design model is the problem of combining microsecond range scheduling and data processing (e.g. fast Fourier transform (FFT), inverse FFT (IFFT), forward error correction (FEC)). For example, 1000 users may be camped on a large cell with 100 users needing to send data, but only 10 users actually get to do it in a transmission time interval (TTI). This is because each of those user's data needs to be processed via all the RAN Layer 1-2-3 stages within the available real time bound, which is inefficient under conventional methods. Additionally, FPGA-acceleration of data plane over peripheral component interconnect express (PCIe) without fine-grained control flexibility introduces inflexible black box behavior and limits disaggregation.

As a result, there are many problems with depending only on x86/ARM programming models for meeting the strict milliseconds range real time constraints for multiple users. Variability in execution time and unpredictability requires mitigation using complex software techniques with significant overhead. This requires more processing horsepower than is actually utilized. Also, big double data rate (DDR) caches are both expensive and power hungry while efficient memory access is essential for the strict real time nature of the RAN. Another issue is that offloading data plane processing with high compute needs to FPGA or application-specific integrated circuits (ASICs) does not solve the problem, and potentially introduces undesired "black box" behavior that are hard to diagnose and correct. Additionally, software upgrades can never be provably tested to fix bugs under all scenarios and cannot ensure that no new real time bugs are introduced. Therefore, there is a need for a solution that addresses at least these problems in the context of an evolving and complex 5G standard.

Aspects of the present disclosure address the toughest of these challenges, namely, the RAN Layer 1 in the context of an evolving and complex 5G standard. In an implementation, a novel domain specific, programmable dataflow/database paradigm for deterministic, real time processing of channels is provided for RANs. It is also understood that the present disclosure may be applied to any real time system (RTS), and not just to RANs.

The subject disclosure further addresses the above-described problems by providing for systems, methods, and machine-readable media for an open, real time, high reliability, white box Radio Access Network (RAN) Layer 1 (L1) platform that disaggregates hardware and software, algorithms and implementation, across the open RAN RU (Radio Unit), DU (Distributed Unit), and CU (Centralized Unit). The disclosed solutions enrich the telecommunications ecosystem that is available to operators in a field-supportable manner.

The disclosed subject matter simplifies and optimizes innovative RAN solution developers to build a differentiating RAN stack for 4G/5G/WiFi, and beyond, with carrier-grade reliability. Advantages include up to 10× cost and 10× power advantage vs. alternate O-RAN platform approaches with x86/ARM plus FPGA accelerators, and 2.5× time-to-market improvements vs. incumbent original equipment manufacturers (OEMs). Additional advantages include the development of a true open ecosystem that is not dominated by a large hardware or systems company as it is today by the large OEMs.

The disclosed system addresses a problem in traditional telecommunications systems tied to computer technology, namely, the technical problem of open, real time, high reliability RAN deployments. The disclosed system solves this technical problem by providing a solution also rooted in computer technology, namely, by providing for a domain specific, programmable dataflow/database paradigm for deterministic, real time processing of channels for RANs. The disclosed system also improves the functioning of the computer itself because it trains the computer to efficiently deploy RANs with minimal overhead.

FIG. 1 illustrates an exemplary telecommunications infrastructure 100, according to certain aspects of the present disclosure. The telecommunications infrastructure 100 may include multiple devices 110 communicatively coupled to a radio access network (RAN) 120. For example, the devices 110 may include 5G/LTE/WiFi enabled devices, such as, including, but not limited to, drones, smart cars, smart phones, smart televisions, smart watches, other smart devices, and the like. In an implementation, the RAN 120 may include gNodeB's, eNodeB's, Multi-Access Edge Computing (MEC) and other edge infrastructures, access points, and the like.

The RAN 120 may be communicatively coupled to a core network 130. For example, the core network 130 may include a 5G core network, an evolved packet core network, and the like. The core network 130 may be communicatively coupled to multiple services and applications 140. For example, the services and applications 140 may be housed on various internet servers for IoT services, applications, IP multimedia sub-systems, operator IP services, and the like. The servers may be coupled to a telephony network, private or public cloud, the Internet, etc.

Figure 2:
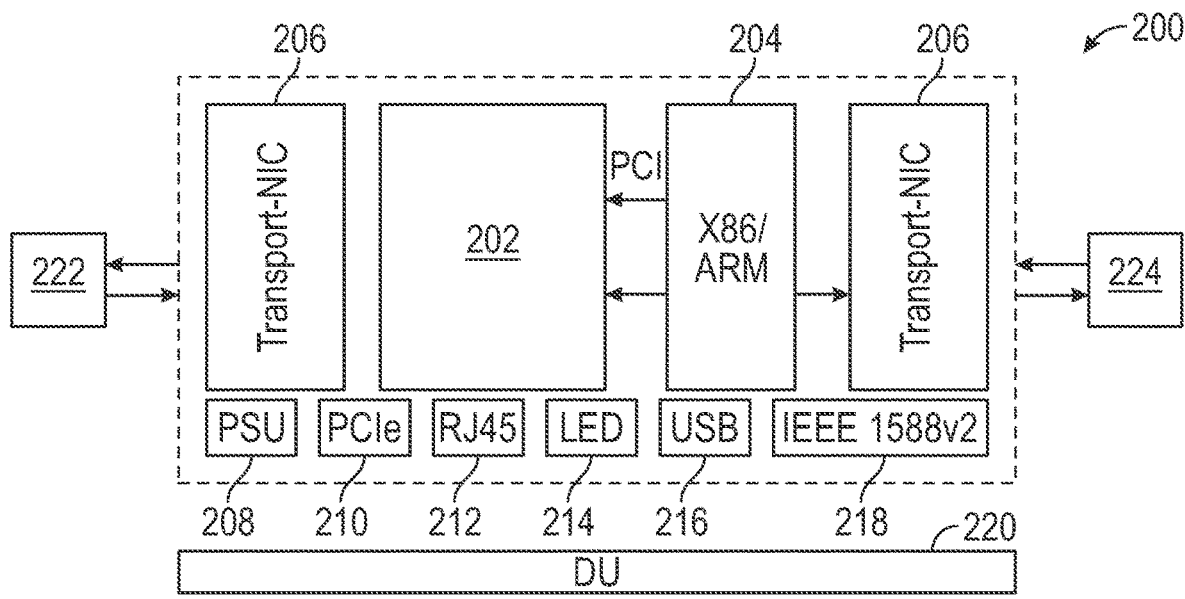
FIG. 2 illustrates an exemplary deployment of a white box component in a telecommunications environment, according to certain aspects of the present disclosure.

FIG. 2 illustrates an exemplary deployment 200 of a white box component 202 in a telecommunications environment, according to certain aspects of the present disclosure. For example, the white box component 202 may be implemented with the support of a network toolchain. According to aspects, the network toolchain may be included on a cloud server. The white box component 202 may be communicatively coupled to a processor 204 via a peripheral component interconnect express (PCIe) interface 210, or the like. For example, the processor 204 may include an x86/ARM processor, or the like. The processor 204 may be communicatively coupled to a transport network interface controller (NIC) 206, or the like.

According to aspects, the deployment 200 may further include a power supply unit (PSU) 208, the PCIe 210, a network connector (e.g., RJ45 or the like) 212, LED 214, USB 216, a protocol 218 (e.g., IEEE 1588v2 or other Precision Time Protocol (PTP), or the like). The deployment 200 may be coupled to a low layer split interface 222 and/or an F1 interface 224 via the NIC 206. In an implementation, the deployment 200 may sit on top of a DU 220.

Figure 3:
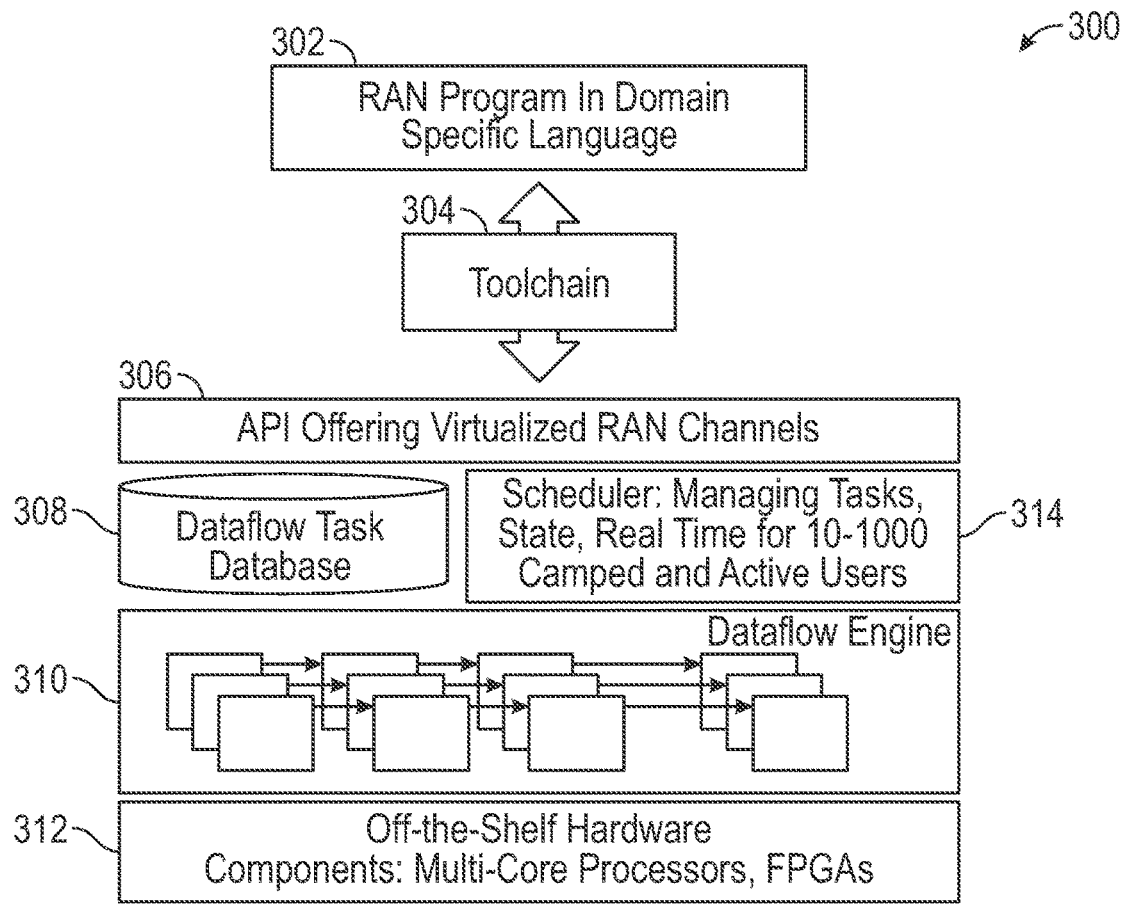
FIG. 3 illustrates an exemplary network toolchain architecture, according to certain aspects of the present disclosure.

FIG. 3 illustrates an exemplary network toolchain architecture 300, according to certain aspects of the present disclosure. The network toolchain architecture 300 may include a RAN domain specific programming language (R-DSL) 302 communicatively coupled to a network toolchain 304. The network toolchain 304 may be communicatively coupled to an application programming interface (API) 306. For example, the API 306 may include virtualized RAN channels.

According to aspects, the network toolchain 304 may also sit on top of a database 308 (e.g., a dataflow task database, or the like), a scheduler 314, a dataflow engine 310, and/or hardware 312. For example, the scheduler 314 may manage tasks, state information, etc., in real time for 10's to 1000's of camped and/or active users. In an implementation, the hardware 312 may include off-the-shelf components, including, but not limited to, multi-core processors, FPGA's, etc.

According to aspects, the disclosed solution includes a white box component (e.g., the white box component 202) being derived from the network toolchain 304, which may include a combination of the RAN domain specific language (R-DSL) 302 and a RAN domain specific architecture (R-DSA). For example, the R-DSA may encapsulate the low level L1/L2 operations (e.g., FFTs, filters, block-wise decoders, as well as deep learning operations, etc.) so algorithms can be built using the available granularity of tasks. The R-DSA itself can map to either FPGAs or certain innovative system on chips (SoCs) with x86/ARM servers as hosts running L1 algorithms as well as on Layer 2 (L2) to Layer 3 (L3).

According to aspects, the RAN algorithms may be included separately from the R-DSA. The R-DSL may also provide virtualized RAN channels to support dynamic scalability of RAN components such as open RAN Distributed Units (DUs). As a result, RAN infrastructure partners (e.g., developers) are not limited in their algorithm innovations by standardized interfaces. In an implementation, the disclosed solution may also provide for deterministic performance intrinsic in hardware for RAN functions and machine learning (ML) assisted functions.

According to aspects, the disclosed solution provides for programmability via the R-DSL. For example, the R-DSL may be cognizant of RAN specific requirements such as real time constraints for each task. This may include pooling of dataflow compute resources, which may be driven by database of tasks. Because the RAN algorithms are not baked into the hardware, new innovative algorithms (e.g., ML based channel estimation) and services (e.g., drone delivery) can be developed/deployed at the "speed of software." The disclosed solutions also provides for 100% real time predictability by design in order to improve robustness and defend against "heisenbugs" (e.g., software errors that seem to disappear or alter their behavior and are difficult to debug).

Figure 4:
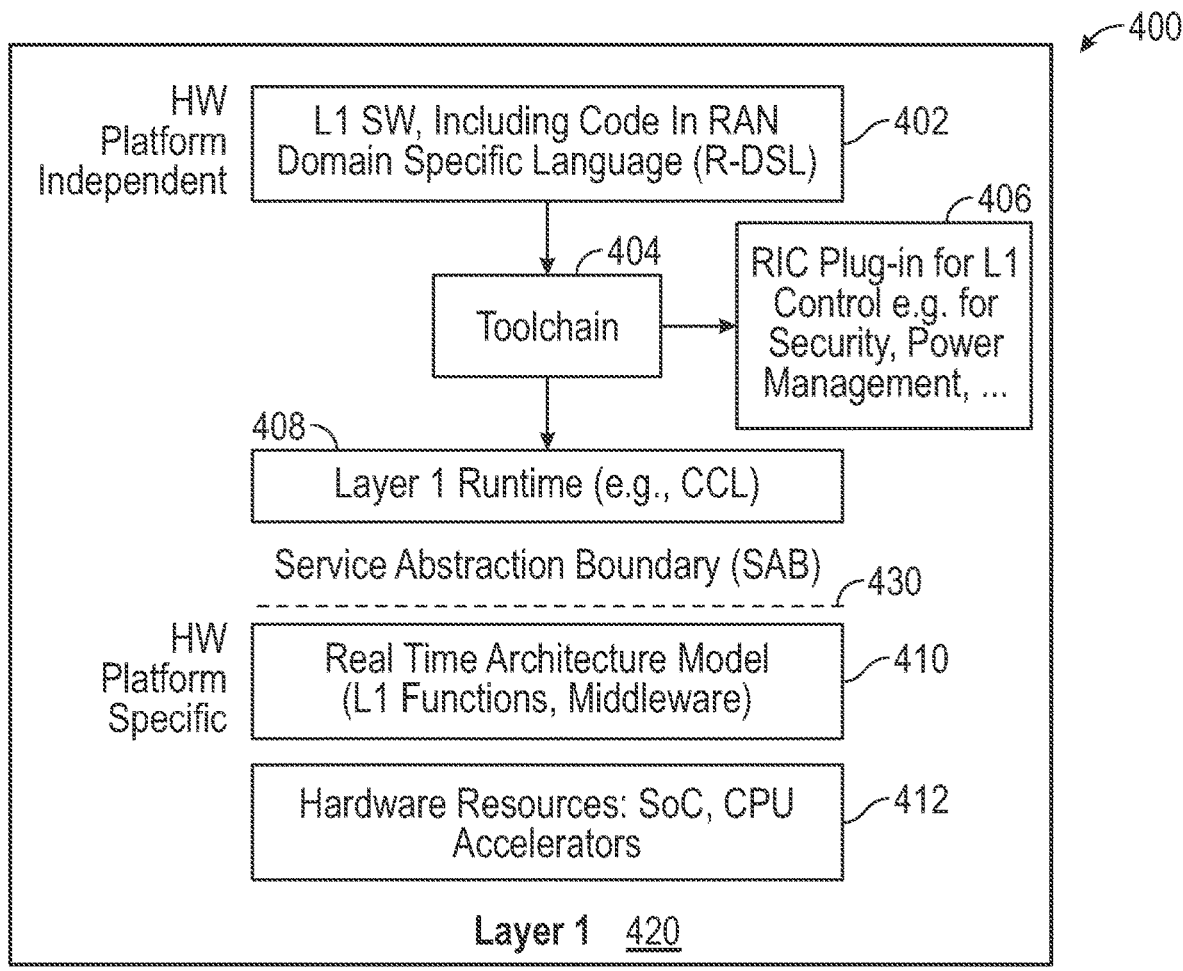
FIG. 4 illustrates another exemplary network toolchain architecture, according to certain aspects of the present disclosure.

FIG. 4 illustrates another exemplary network toolchain architecture 400, according to certain aspects of the present disclosure. The architecture 400 may include an R-DSL 402 (e.g., a domain specific programming language) that communicates with hardware resources 412 (e.g., SoC, CPU, accelerators, etc.) of a RAN Layer 1 420. For example, the R-DSL 402 may be a declarative programming language that is hardware platform independent (e.g., hardware agnostic). In an implementation, the R-DSL 402 may be communicatively coupled to a network toolchain 404. For example, the network toolchain 404 may include white box components for coupling to a Layer 1 runtime 408 (e.g., a configuration and control layer (CCL)) and a RIC 406. The RIC 406 may include a RIC plug-in for L1 control (e.g., for security, power management, etc.).

According to aspects, the architecture 400 may include a service abstraction boundary (SAB) 430 that separates the network toolchain 404 from the hardware resources 412. For example, a real time architecture model 410 (e.g., the R-DSA) and the hardware resources 410 may sit below the SAB 430, whereas the R-DSL 402 and the toolchain 404 may sit above the SAB 430. The model 410 may be hardware platform specific. In an implementation, the model 430 may include L1 functions, middleware, etc.

According to aspects, the SAB 430 may separate what is hardware specific (e.g., middleware, which is below the SAB 430) and what is not (e.g., what is above the SAB 430). As a result, the SAB 430 creates and allows for true open RAN hardware and software dis-aggregation, which is supported by automation through the network toolchain 404. In an implementation, the SAB may also similarly be applied to layers above Layer 1, such as elsewhere in the RAN between the DU and the CU, and also to the rest of the network beyond RAN (e.g., anywhere programmatic interfaces are utilized).

According to aspects, the disclosed solution may utilize both the R-DSL 402, including the network toolchain 404, and the SAB 430 in a way that will be easy for the RAN ecosystem to adopt without any specific mandates. Advantages of hardware/software disaggregation includes providing value to all relevant parties in the RAN ecosystem. Specifically, the disclosed solution allows hardware server/silicon vendors to enable multiple software vendors on their hardware/SoC over a common middleware interface of the SAB 430 for RAN. This allows a software vendor to add new features as well as adopt a hardware platform quickly and efficiently without investing in a big way in hardware platform specific research and development and expertise to meet power/real-time/capacity goals. This also gives operators true multi-vendor options and control over their infrastructure when it comes to optimizing for QoS, power, security, capacity via the R-DSL 402, through the RIC 406. This also provides algorithm designers safe access to L1-2 in real time via custom RIC x-application level hooks into L1/L2.

According to aspects, the SAB 430 may include major classes of items that are exposed from below (e.g., from the middleware). These items may also expose interfaces and characteristics of the hardware 412. In an implementation, the architecture 400 may include hardware optimized L1 function interfaces, which may include loosely coupled acceleration such as LDPC running on FPGA, and/or tightly coupled acceleration such as modulation functions leveraging Intel AVX-512 instructions (e.g., such as in the Intel FlexRAN hardware). In an implementation, hardware that is accelerated may be exposed through the SAB 430. For example, function modules may perform bit manipulations in high PHY, FFT, or RAN, slicing efficiently on specific hardware. The R-DSL 402 then may define a generic interface to interact with the hardware. Also, with this approach, new innovative functions can be added without the need for standardization of programming instructions. Additionally, software interfaces to these functions may be included with chipsets provided by vendors already, which are easy to adapt to the SAB format.

According to aspects, the SAB 430 may also provide for RAN domain specific pattern definitions, which may be for data organization and movement, and task scheduling. For example, caching and direct memory access (DMA) may be utilized to move and/or access data packets/frames/slots. Because each hardware vendor may implement these functions at low levels differently, the SAB 430 abstracts out the repeatedly used data movement and task scheduling patterns, along with timing characteristics. In an implementation, the patterns may depend on what features the operator is trying to control (e.g., performance, power, flexibility, trace and exposure of analytics).

According to aspects, SAB 430 specifications in open source may eventually have more patterns than a particular modem hardware might support (e.g., patterns coming from experts from the ecosystem who understand RAN domain specific behavior). If so, a subset of the patterns may selected based on knowledge of the hardware and middleware beneath, without changing the R-DSL 402. In an implementation, the patterns may include empty elements.

According to additional aspects, the SAB 430 may be utilized from the top of the architecture 400. For example, for each new hardware vendor, the network toolchain 404 will be equipped with an architectural model of the hardware (e.g., similar to the way hardware backends to GPU/CPU/TPU are added to Tensorflow via XLA) that knows the hardware capabilities exposed through the SAB 430 as well as timing and other characteristics. As a result, the generated runtime is able to enforce real time, and other domain specific constraints, etc., via the capabilities of the hardware 412 exposed through the SAB 430. In an implementation, a developer writing slot processing code will only have to describe functionally in a high level language (e.g., such as C, C++, etc.), and specify the domain specific constraint (e.g., slot timing requirement) in the R-DSL 402, and the network toolchain 404 and the SAB 430 may handle the rest.

This is advantageous because conventionally, developers writing codes, such as a slot processing, code will also need to have low level hardware expertise and awareness to ensure that their code meets slot timing requirements on that specific hardware device. This also requires in a lot of hand optimization and experience regarding L1 software. However, given that the domain specific behavior is well understood and standard specified, the disclosed solution seeks to isolate and automate this resource intensive part. This saves the RAN software developer costly research and development time, and allows them to focus on what they do best, which is the algorithmic differentiations. The disclosed solution also provides flexibility of just re-configuring the software for various scenarios (e.g., macros, IIoT, rural, etc.) on the same hardware without hand tuning every time, as well as exposing instrumentation and control safely to the RIC 406.

According to aspects, L1 functions may separate out hardware specific behavior below the SAB 430 to create the middleware 410. The R-DSL 402 may include instrumented code (e.g., standards based processing and algorithms) on top of the SAB 430. In this way, both specific middleware 410 (e.g., below the SAB 430) as well as the L1 software that goes on top may be produced. The two may also be integrated with the network toolchain 404, which further saves development time. The resulting optimized L1 software will also provide the L1 hooks into the RIC 406.

According to aspects, the R-DSL based L1 software that goes on top will be portable to another hardware platform. This portable part of the L1 software may include all algorithms and the actual signal processing. For example, the L1 software may be compatible with all hardware devices, regardless of manufacturer. All the code above the SAB 430, which includes algorithms, will be portable and able to be integrated via the network toolchain 404, thus saving months (e.g., at least 6 to 12 months) of R&D effort.

According to aspects, the functions may be wrapped in an acceleration block and exposed via the SAB 430. Any function that is self-contained and optimized for a specific hardware platform may be utilized. In an implementation, a basic, generic, and extensible interface definition may be created for all such blocks, so more can be added without further developer involvement. For example, such a functional block may reserve a fixed amount of hardware resources for its lifetime. Additionally, the patterns in the SAB 430 can manipulate that functional block's resource usage and enable its integration with the rest of modem functionality.

According to additional aspects, wrapping functions may be reserved for functionality that otherwise leads to a significant performance degradation, if not closely tied to the hardware. For example, the following list of functionality may be exposed via the SAB 430 as described above: FEC (Turbo, LDPC, Polar encode and decode), general medium to large matrix operations (e.g., used to construct MIMO and channel estimation solutions), low level algorithmic manipulation of small data sets (e.g., the generation of parameters used to smooth estimation, like doppler or AGC, which may occur on a single CPU using a small, well-defined set of data written in C and encapsulated for compilation by a local compiler, then the result will be treated as a single CPU resource event in the SAB and pattern management), and/or bit mapping and de-mapping. In an implementation, a generic parameterized block for standardized bit manipulation may be utilized.

Power management improvement is achieved because each of these well-defined blocks is manipulated in the patterns in the SAB and opportunities for power saving can be identified automatically by a toolchain search. The patterns may also be manipulated to add power management features. The result can be visualized by the user and potentially the R-DSL programmer can add their own power management constraints beyond those discovered by the toolchain.

According to aspects, the SAB patterns may be low-level, and the L1 software developer may express the domain specific constraints and intents at the higher abstraction level via the R-DSL 404. The network toolchain 404 translates the R-DSL code to map to the lower level SAB 430, thus automating one of the most painful parts of RAN development. One-time effort of middleware development for a specific hardware/SoC platform may also include interpreting only the low level patterns. Overall this approach results in a robust design and implementation that avoids heisenbugs by design.

According to aspects, the SAB 430 will support a superset of patterns and the disclosed solution may use a subset of these for a particular hardware target. For example, the hardware will expose what patterns it supports. This allows for a diverse choice of hardware architecture and innovation in hardware to occur. According to aspects, timed reservation of a set of hardware resources (e.g., compute and memory), and/or opening up a recurring reservation in space and time (e.g., for a RESTful type of operation), which may be utilized by the architecture 400 for runtime for regular resource access or as a well from which to sporadically draw resources (e.g., to access wrapped functional blocks in a sequence as described herein). Dataflow management patterns may also supply data in various structures from managed storage as well as replenishment of that storage.

According to aspects, security patterns may include extensions of the above-described patterns with extra overhead for secure access, built in encryption, and root of trust support. For example, this may include executive second level patterns (e.g., patterns composed of other patterns with additional constraints) for security levels control and access control. Monitoring patterns may be utilized for security breach detection.

According to aspects, power management patterns may include executive second level patterns that implement the power requirements from the R-DSL 402 through the network toolchain 404. These patterns may manage other patterns in the system by constraining their use in space and time. They may also have access to power management hooks in the hardware 412.

According to aspects, analytics, trace, and debug patterns may be defined via the R-DSL 402 allowing for the use of SoC level resources generally for analytics, and not just specialized on-SoC trace hardware. The patterns may include error recovery, management, and reporting patterns. The patterns may also include access and system management patterns via RIC 406, L2, and other interfaces.

According to additional aspects, the R-DSL 402 may include capability to create new interfaces into modem functionality at the R-DSL level. This is possible because of the abstraction of the R-DSL 402, where the functionality is created before integration and real time planning and enforcement. This allows an interface to the RIC 406 to be created with exactly the information required, as well as the frequency and latency of message passing that is defined by a software developer.

In an implementation, interfaces to the L2 may be similarly created and the L2 can request functionality with certain real time characteristics from the L1. For example, the architecture 400 may absorb the relevant L2 functionality within the R-DSL 402 via primitives for accessing specific measurements (e.g., which may change depending on the algorithm), user groupings, and matrix based computations to support decisions. L2 driven user grouping for MU-MIMO that utilize hardware resources may be shared for certain matrix computations, and may utilize such functions implemented in hardware and exposed via the SAB 430. The network toolchain may also be utilized to enforce real time and other constraints. As a result, any MIMO algorithm may be enabled via the R-DSL primitives without being restricted to any specific ones.

As described herein, cellular infrastructure modems are Firm Real Time (FRT) systems. This means that individual jobs have deadlines, and in the modem case it is often that a Directed Acyclic Graph (DAGs) of jobs will have a single overall deadline. If the deadline is missed, the DAG output is worthless and error recovery would be required. However, it is possible to absorb a small amount of missed deadlines and still have the system meet its Quality of Service (QoS) and/or Quality of Experience (QoE) goals.

As the complexity of modem requirements has increased dramatically going from 3G to 4G and now again going from 4G to 5G, the largest problem in the development of a cellular infrastructure modem has become its resiliency to heisenbugs in the face of complex and changing functional requirements. Also there is a large variety of requirements for Radio Access Network (RAN) use across a single network depending on traffic patterns, service use, Base Station Transceiver (BTS) location, cell size, etc. Ideally a single code base can support this spectrum of requirements and also allow rapid and agile code updates. The RAN may also interact and react to input from Machine Learning Algorithms that are working at the network optimization level, and additional analytics may be received from the modem.

If one examines some of the common causes for heisenbugs and other bugs in a FRT system and also examine the root causes of difficulties in modifying FRT code of the type used in cellular modems, one sees that the most difficult bugs (e.g., those that make their way into the production system and are only found in the field) are due to incorrect access of data (e.g., read before write, and the like), overflow of buffers due to late access, or the dropping of data due to contention at shared resources. All of these problems can be traced to unexpected access, or unexpected lack of access, to managed data buffers, causing data to be misplaced or misread. The use of classic dataflow methodologies does not solve this issue as they assume back pressure can be applied to freeze parts of the modem while waiting for other parts of the modem to catch up. However, a modem has periodic and continuous streams of data, coming in and leaving from the antennas and the higher layers. Delay in one part of the system can cause another part that is closer to these streams to fail.

A novel architecture may implement a cellular infrastructure modem (e.g., the layer 1 of the RAN stack), which will also have application in other areas where complex FRT requirements exist, such as the layer 2 scheduling of the RAN. In this architecture a user first defines the streams of data required, both due to input/output from the physical system, and internal for buffering and delaying data elements. For example, modems function with an overall rhythm set by a standard defined modem specification, and at which the data moves in and out of the modem. As a result, operations within the modem will run at harmonic multiples or divisions of this period. The user may assign to each stream a period of repetition, and enforce that the stream can and will accept new data, either from the outside world or from another stream during a subset of this period. The stream may also be exposed to this data for copying during a subset of this period.

To simplify ensuring correct operation the user may specify that these two regions, for writing (e.g., definition region) and reading (e.g., observation region) do not overlap. This pattern of streams is set up at compile and configuration time and at runtime is deterministic using dedicated resources to ensure its operation. The user may define a stream controller to be the architectural unit that manages the streams. This may also be implemented in a distributed manner and may be implemented in hardware or software or some combination of both.

According to aspects, the other source of input and output from streams may include processes that perform computations, reading and writing data as part of this process. For example, these processes may read and write only from streams, and may only be allowed to write to an element of a stream during the time it is active in its definition period and will only be allowed to read from an element of a stream when it is active in its observation period. If a process misses a definition period the element will be marked as empty by the stream controller and will be read as such by any other observing process or stream.

According to aspects, each stream may include a continuous flow of data elements with a known period of update where each element will eventually be defined as empty or not empty and can then be accessed. Each stream may also include a maximum range of observation defined as how many elements into the past remain available for observation. For example, once an element has passed out of this range it can never be observed and may be discarded. In an implementation, a stream may only be defined during its single definition period.

According to aspects, a process will read data from a number of streams during the observation phases of those streams. If the process attempts to read outside of the observation region of a stream it will receive an empty element. Otherwise it will receive a non-empty element and the defined data in that element. According to aspects, a process may read from several streams at different observation regions which may cause it to become active to read the stream and then inactive until the next observation region. For example, a process may include a memory move operation performed on a DMA engine followed by processing on a compute engine and then another memory move operation on a DMA. Hence, the process may be distributed across engines and may share these resources with other processes. As a result, organizing these processes to share resources and still define and observe elements in the correct regions may be reduced to a classical scheduling problem over shared resources.

According to aspects, a process may modify its behavior depending on the pattern of empty it sees on its input. A stream element may be empty because of a scheduling error but it may also be empty because of a correct algorithm decision. Therefore, the process may employ a mechanism (e.g., similar to a case statement) to call different subroutines depending on what pattern of empty is observed. In an implementation, the process may also change its processing strategy as it reads elements but before all elements are completely read. For example, it may choose not to request a DMA resource to read another element based on empty patterns it observes so far.

According to aspects, a stream controller manages a deterministic flow of streams with specific regions of access to stream elements. For example, all access requests may go through the stream controller. In a modem some algorithmic decisions and parameters passed from the Layer 2 scheduler will change the amount of data flowing in the modem. As development of an opportunistic memory management controller is prone to difficult bugs, overflow and underflow errors, the stream controller exposes a deterministic pattern of streams and uses empty elements to annotate where data is not present.

According to aspects, during configuration or compile, the user may discover a way to save physical memory, or system power by sharing memory between multiple elements, because of a known relationship between those elements. This may then be compiled into the runtime of the streams and hidden from the rest of the system. In this way the optimization of data management is decoupled from changes in the processing. As a result, the disclosed solution exposes a highly regular, deterministic, and redundant data flow to the processing while optimizing the creation of this dataflow internally.

Figure 5:
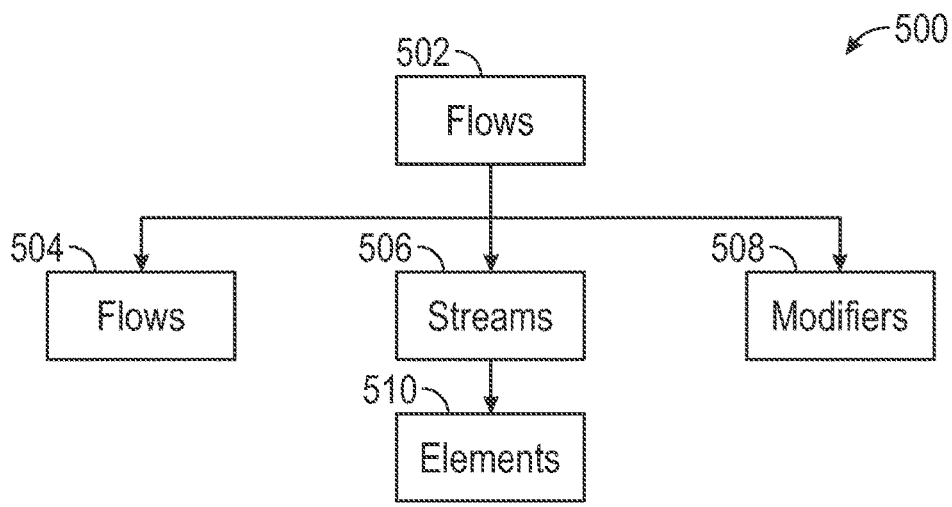
FIG. 5 illustrates an exemplary structure hierarchy for a RAN domain specific programming language, according to certain aspects of the present disclosure.

FIG. 5 illustrates an exemplary structure hierarchy 500 for a RAN domain specific programming language (e.g., the R-DSL 402), according to certain aspects of the present disclosure. The hierarchy 500 may include flows 502 (e.g. first flows), flows 504 (e.g., second flows), streams 506, modifiers 508, and elements 510. For example, the flows 502 may be at the top of the hierarchy 500, the flows 504, streams 506, and the modifiers 508 may be in the middle of the hierarchy 500, and the elements 510 may be at the bottom of the hierarchy 500.

According to aspects, a user may define each flow 502, 504 as a group of streams 506 of the elements 510. For example, each stream 506 may be static, immutable, and include a conceptually infinite structure whose values are defined only once, but not all at once, and may be exposed to a function that needs to know them. In an implementation, the flows may contain other flows as well as streams and modifiers. In this way, there may be deep nesting of flows in the language.

According to aspects, a novel concept for baseband SoC code development allows for code to be ported across SoC with no change in the code. This is possible because a SoC architecture aware tool (e.g., a SoC level compiler for modem code) is included that optimizes the developer code for the SoC target platform. For example, the R-DSL 402 may be utilized for modem development to enforce the most important features of modem operation, as described above. This also further allows for a strategy for middleware development that can be applied to any of the architectures commonly used for modem development.

According to aspects, an R-DSL (e.g., R-DSL 402) may focus on the part of the modem code development that manages data movement, data structures and data processing to ensure it is bug free under all real time scenarios. For example, it simply calls native code that is written for the target SoC to perform the detail functional subroutines that process data. In an implementation, the R-DSL may be a meta-language.

According to aspects, the R-DSL may define streams (e.g., streams 506) of data elements (e.g., elements 506) as infinite length immutable objects. As a result, developers working on the streams will not have to worry about access timing and order. For example, each stream has a defined logical period of update for the purpose of aligning the rate of update of different streams to each other in the tool.

According to aspects, the R-DSL may define modifiers (e.g., modifiers 508) to be computational structures which will call one or more object codes to run computations on the data. According to aspects, the R-DSL defines flows (e.g., flows 502, 504) to be graphs of modifiers, streams and other flows, connected together with defined input and output streams. For example, each flow may include a defined period of operation and all streams and modifiers in the flow operate at that period. In an implementation, flows embedded in other flows (e.g., child flows) may have different periods which are defined relative to their mother flow. For example, elements can be defined as collections of other elements, and streams can split to produce multiple streams of the same rate. Additionally, streams can communicate with other streams of different rates by splitting or joining elements.

According to aspects, each stream element may include a period during which it can be accessed. For example, the R-DSL may not specify when this period is, but just that it exists and is split into two regions. The temporally first region may include definition(s) of the immutable element object, and the other disjointed and later region being for observation. The tool may decide on a specific real time region for each, based on the developer input and SoC constraints.

According to aspects an element may be marked as empty before its definition region opens up. For example, if the element is filled by a stream, the middleware on the SoC will be configured to guarantee it will be defined and then marked as not empty. If the stream is defined by a modifier, the modifier may not define it (e.g., using a commit operation in the middleware) and the element will remain marked as empty. This may occur because the modifier does need to define it or may be due to a scheduling failure.

According to aspects, only one modifier, or other stream, can define an element in its definition region. For example, the modifier, or other stream, may only define an element once. This allows the tool the option of reacting immediately to a commit of a definition to the element.

According to aspects, many modifiers or streams may observe the value of the element in the observation region, but only during the observation region. This allows the R-DSL to manage data in and out of cache, or other close memory, efficiently because the use model of that data is well defined.

According to aspects, the modifiers may define the actual use of data and provide a maximum runtime estimate for the functional code the modifier is supporting. This information may be defined in the modifier R-DSL code of the developer along with a reference to the function object code that has been written and compiled to run on a resource in the target SoC. The modifier may reference several versions of this runtime object code that all perform the same function. For example, one may run on a CPU and another may trigger an API call to an accelerator or a GPU.

According to aspects, information about runtime and data size given by the modifier R-DSL may be propagated up the tree developed inside of the tool when it flattens the code by exposing the streams and modifiers within other flows. This allows the definition of elements as collections of elements lower in the tree, in both space and time. For example, the modifiers are the leaves of this tree and will define the precise size of the elements along with other contextual information. This information is passed up the tree by the tool to precisely define the collections of elements that go to make up elements in other streams. Once the top of the tree is reached the tool develops a data structure around the resulting element collection. Therefore a change in a modifier or an addition of a new modifier or stream by the developer may lead to a significant change in the data structures used in the SoC. This removes a significant impediment to agile real time programming of the modem SoC, which is that small modifications had to work with the existing data structures, which is often a difficult and error prone process.

According to aspects, the toolchain (e.g., the network toolchain 404) will take this R-DSL structure with a precise but abstract data structure definition as well as a precise ordering and repetition period for data update and object code calls, and configure the SoC to produce a deterministic and highly reliable set of periodic data updates. The object code may then be scheduled to work on the values within this deterministic space time data flow.

According to aspects, the R-DSL may generally define a highly redundant graph of streams. For example, the Layer 2 may send messages periodically to the Layer 1 modem that tells it which users and which channels will be processed in this period. To achieve reliable performance the modem may be specified for bug free operation and may address scheduling failures in a proper manner. Therefore a certain amount of worst case operations (e.g., for worst case scenarios) may be built into the modem. In an implementation, the R-DSL allows the specification of the worst case operation of the modem in a hierarchical manner through the parameterization of flows. For example, in any particular L2 message period, a subset of the defined streams may be used and a subset of a streams elements may be used. The empty signifier on an element may allow the stream to be sparsely populated in the R-DSL in a composed and regular manner while still allowing for the flexibility to support a different L2 message every period.

In order to allow more efficient, while still deterministic, implementation of the streams, as well as more effective scheduling of modifiers, the R-DSL may also allow for the use of assumption logic within the flows. For example, assumption logic is first order logic that defines inequalities between parameters in the system, allowing for a much richer set of relationships between worst case stream sizes. For instance, an administrator may define the maximum number of users to be U and the maximum number of RBs per user to be $R_u$. The maximum number of RBs (e.g., because they are shared amongst users by the L2 message) may be R. Therefore $R \ll UR_u$ and the precise relationship can be entered into the R-DSL as a constraint for optimization.

According to aspects, the modifier R-DSL may be defined with a statement (e.g., "pattern{ }", "guarded{ }", or any user defined statement) which uses assumption logic to define the pattern of empty and non-empty elements seen on a particular call to the modifier, followed by an action based on that pattern. This allows the modifier code to define what to do in the event of an observed runtime error, for instance, and also allows the developer to define a modifier that reacts to different subsets of data from its inputs. This is impossible to do using more common dataflow languages.

According to aspects, the definition of the assumption logic may be provided directly by a developer, or the constraints may be developed based on data analytics of the performance of the modem, and/or the network the modem is embedded in. This allows data analytic programs or Machine Learning (ML) and Artificial Intelligence (AI) programs to be written that observe KPIs from the modem and network and use these to learn improved constraints for the modem. Once a new modem constraint is developed by the ML or data analytics system, the R-DSL can be recompiled and a new modem code image created without operator intervention. The new modem functionality can then be applied to the hardware to, for instance save power, or increase system capacity, or to improve the service Quality of Experience (QoE) for the limited resources on a given modem SoC, based on higher level QoE goals. The tool may also build in constraints that override correct operation in order to maintain a certain power level in the modem, for instance.

According to aspects, AI may allow a human operator to request modem functionality in an intent based manner. For example, intent based AI runs based on incomplete knowledge allowing the user to interact with the modem in a similar fashion to how humans interact with smart speakers. In an implementation, the toolchain may make assumptions about incomplete knowledge and set the constraints based on this intent request. It will then search for a solution that is feasible on the modem. If none can be found the tool can return with alternative suggestions for the user based on other assumptions about the incomplete knowledge. The tool can also explain why the request was infeasible. As a result, expert knowledge can be built up from interactions with other network users using data analytics.

According to aspects, the toolchain takes the R-DSL and produces an Intermediate Representation (IR) description of the developer code using the R-DSL and constraints, as described above. This IR can be optimized onto a set of pre implemented patterns in the SoC middleware (e.g., the Service Abstraction Boundary (SAB) 430). The patterns represent streams and modifiers in a general way and can also represent groups of streams and modifiers that have been optimized to run as a single control level group to reduce control overhead. It is understood that these are just examples of how the tool may optimize the IR and other optimizations are also possible.

According to aspects, the SoC middleware allows these patterns to be configured by a file created by the tool so that at runtime they are "hardened" into a specific set of streams and modifiers, along with a scheduler for the object codes referenced by the modifiers. The tool also creates runtime code (e.g., CCL code) that sits above the middleware and interprets the L2 message in order to finally define the operation of the modem for that period.

According to aspects, the SAB may include a superset of good patterns for each supported SoC target. This allows the tool, which is target aware, to choose the appropriate subset of the SAB for that target. There is no downside to having a redundant SAB as the tool picks only what it needs and the unused patterns are not physically present in the code.

According to aspects, the R-DSL also allows for the definition of new flows so that it can interface easily to new APIs. This allows users to open up new interfaces to send developer specified data analytics, for instance, to the RAN Intelligent Controller (RIC). In an implementation, interfaces to data from outside of the R-DSL definition may be defined using stub modifiers that have either only inputs or only outputs. A stub modifier with only outputs is used to read data from an external source and place it on R-DSL defined streams at a given period. Similarly a stub modifier with only inputs will write data from defined streams to locations outside of the R-DSL definition.

Figure 6A:
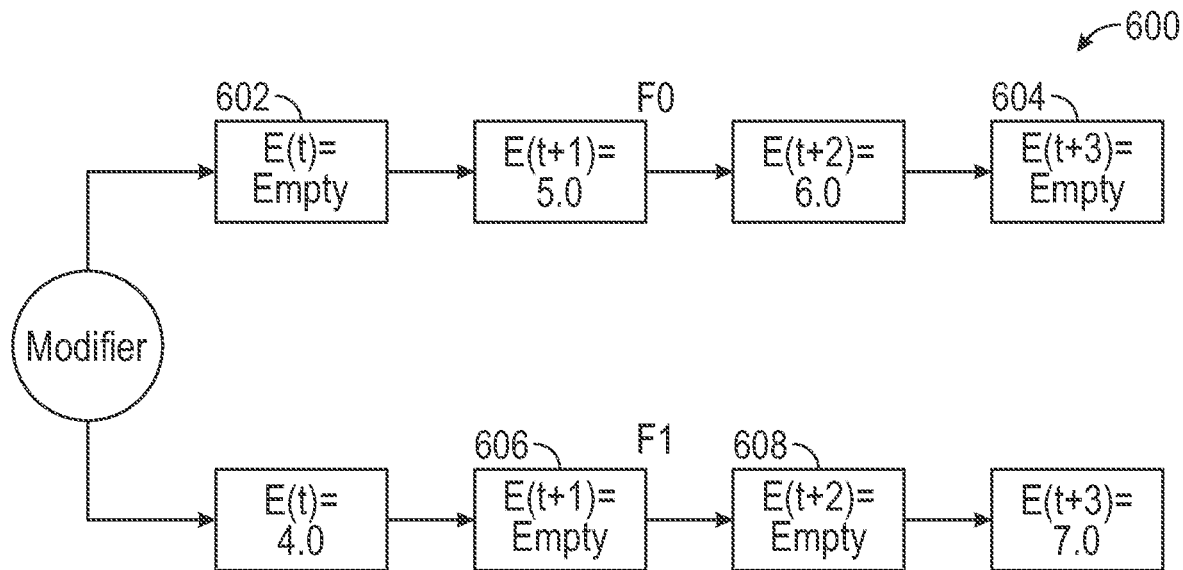
FIGS. 6A to 6C illustrate exemplary static flow data streams having empty elements, according to certain aspects of the present disclosure.
Figure 6B:
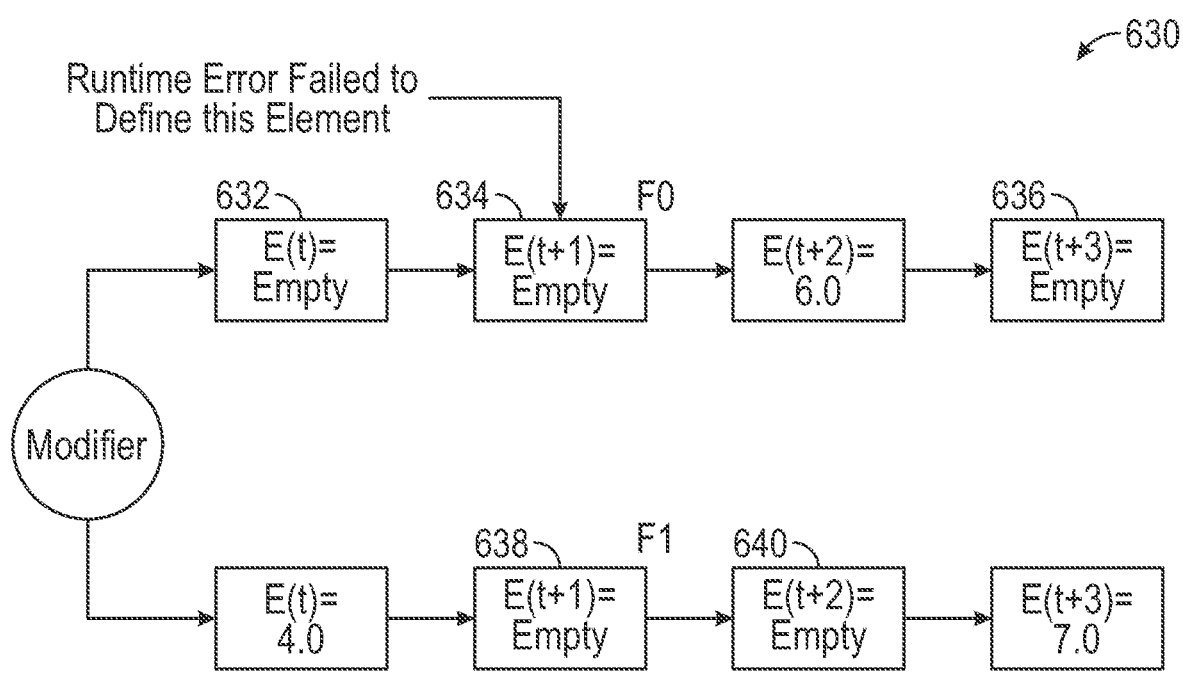
Figure 6C:
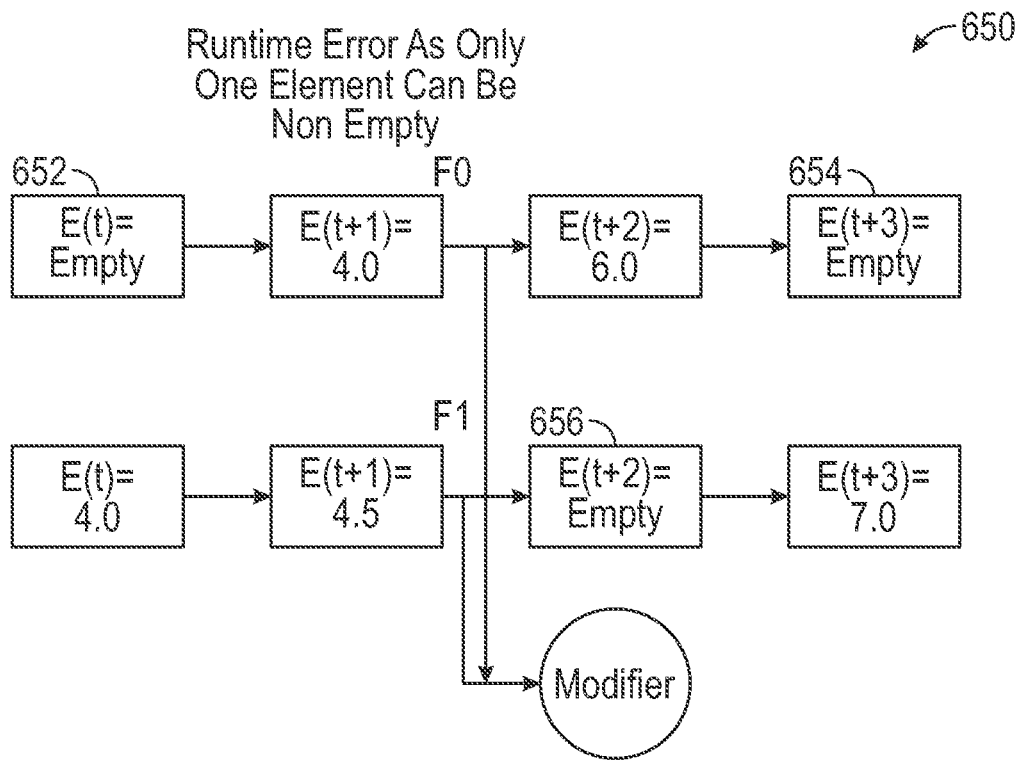

FIGS. 6A to 6C illustrate exemplary static flow data streams 600, 630, 650 having empty elements, according to certain aspects of the present disclosure. For example, the shape and rate of a stream may be fixed and its values are immutable based on the modifier used to define it, among other things. This allows the data buffering requirements to be precisely known. The tool can then reliably and efficiently manage data movement. If there is a runtime data dependent variation in the flow of data it is exposed by the programmer as a redundant set of static flows, some of which might not be used depending on the runtime decisions. This leads to empty elements at runtime.

Referring to FIG. 6A, a first data stream 600 includes empty elements 602, 604, 606, 608. For example, a modifier is choosing to send its output in one of two directions, leaving the other flow with an empty element during that active period. Of course the goal of the tool is to implement this scenario efficiently but the R-DSL exposes the user intent cleanly in this manner. It is also possible the modifier may try to define an element in a stream, but may fail due to hardware timing issue. Such elements are immutably marked as empty.

Referring to FIG. 6B, a second data stream 630 includes empty elements 632, 634, 636, 638, 640. For example, the second data stream 630 may be similar to the first data stream 600. The failure of the modifier to fill the correct element, due to some timing or other runtime error, is not flagged as an error immediately and the next modifier that consumes this data will have to decide how to deal with this event. This is the most robust way to deal with this kind of runtime error in the above-described distributed, heterogeneous and multiprocessor real time environment. It is possible for instance that this error has no impact on the future flow of the system and does not need to be flagged at all. Also, the subsequent modifiers may be able to recover from the error if the programmer develops a plan for this eventuality.

From a runtime point of view the elements are empty by default unless defined. Therefore, definition of an element is actually an opportunistic event but the flow for a particular pattern of defined elements is deterministic. Some defined element patterns will be considered error conditions and error management functionality will be implemented for these patterns by the programmer.

According to aspects, not all empty element patterns imply errors however, as shown in FIG. 6A, where they are used to implement a choice at some later time. It may be the case that a modifier will expect only one of its observed elements to be non-empty and will generate an error if this is not the case, as shown in FIG. 6C.

Referring to FIG. 6C, the modifier in this case may decide what to do with this error. For example, a third data stream may include empty elements 652, 654, 656. It may have a recovery function or may raise a flag and return an empty to the flow it is defining. There are many possibilities and the programmer may decide what the right course of action is at this time as this may be a radio algorithm implementation decision.

According to aspects, top level assumption logic may be defined and utilized by the modifier to define the constraints on the observed elements for correct operation and also define what to do in the case of an error pattern. It is also possible that a modifier only defines a subset of the elements available to it, therefore leaving the others empty, and logic to this effect can be added as well. The toolchain will not blindly use the redundant data flow pattern defined by the programmer. It will look for constraints in the pattern and develop a strategy to minimize the data buffering overhead while keeping the control code overhead low. As a result, if the toolchain cannot work out if a particular element will be empty or not, it must assume it will not be and manage the data storage for it.

Conventional synchronous data flow (SDF) suffers from the problem that the functionality of the system may change and this has led to many variations of SDF (e.g., such as piSDF and SADF). In contrast, the disclosed solution allows for elements to be ignored in certain cases and observed multiple times in other cases. This is possible because in the disclosed methodology the elements can be written once and read multiple times when they are in their "active phase" that is defined by the rate of the flow. The solution does not rely on dataflow arcs to define when data is consumed or produced, but rather, keeps the data to a strict schedule, developed and optimized by the toolchain.

According to aspects, an element may be read multiple times and, is therefore not consumed in the SDF sense and it also doesn't trigger an event in the SDF sense, when it is active for "observation." As a result, elements may be defined at most once during the time it is active for "definition." The streams are therefore independent of any functionality in how and when they progress, except for the values they contain that depend on the functions that access them during active periods. As a result, this regularity may be utilized to group and simplify the control management as well as produce clean code for data movement strategies.

Figure 7:
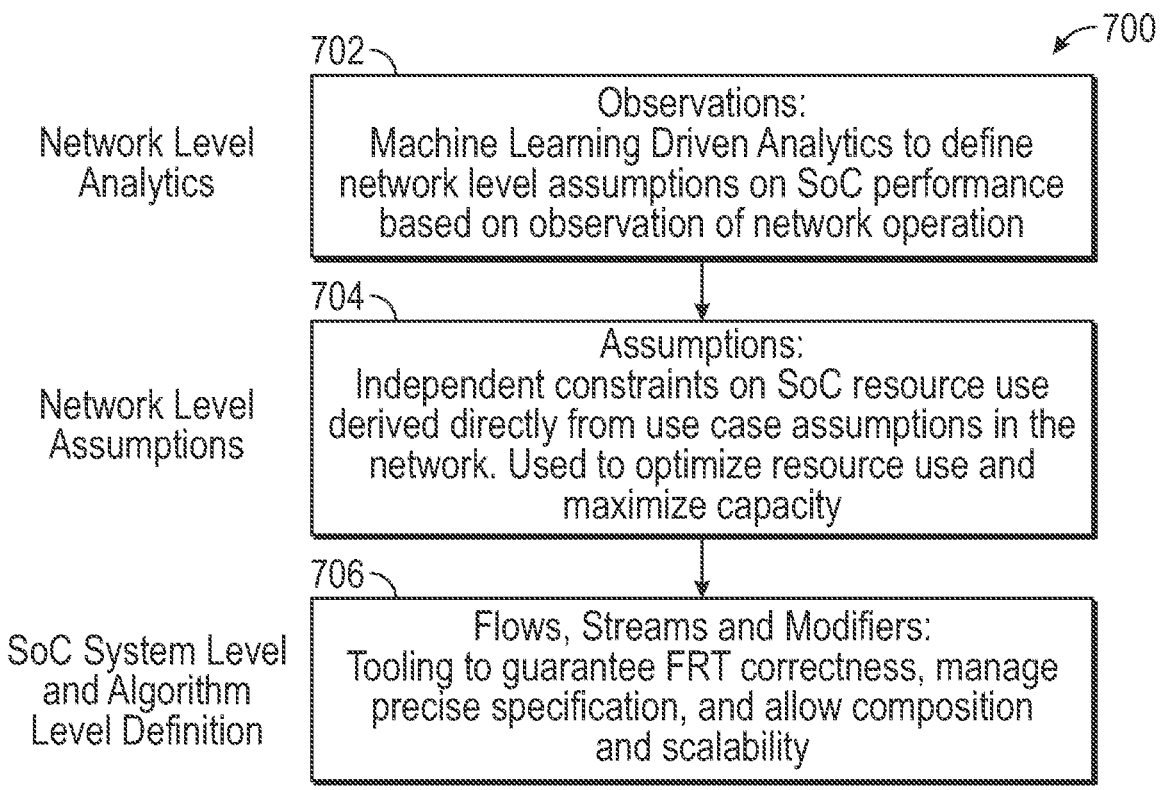
FIG. 7 illustrates an exemplary flow for assumption logic of a network, according to certain aspects of the present disclosure.

FIG. 7 illustrates an exemplary flow 700 for assumption logic of a network, according to certain aspects of the present disclosure. The flow 700 may include network level analytics 702, network level assumptions 704, and SoC system level and algorithm level definitions 706.

According to aspects, the network level analytics 702 may include observations conducted through ML driven analytics to define network level assumptions on SoC performance based on observation of network operation. The network level assumptions 704 may include assumptions based on independent constraints on SoC resource use derived directly from use case assumptions in the network. For example, these may be utilized to optimize resource use and maximize capacity. According to aspects, the SoC system level and algorithm level definitions 706 may include flows, streams, and modifiers to provide tooling to guarantee FRT correctness, manage precise specification, and allow composition and scalability.

According to an implementation, the R-DSL may be converted into an intermediate representation (IR), which may be a straight translation and flattening of the R-DSL. As described below in FIG. 8, the IR may be backpropagated to propagate information in the elements. The IR may then be utilized in an optimizer of the tool chain to transform the description into something that can be pattern matched to the pattern set given for the hardware while still meeting constraints given as part of the R-DSL. A configuration and control layer (CCL) code may be generated that executes on the control processor(s) in the hardware to manage the patterns at runtime.

Figure 8:
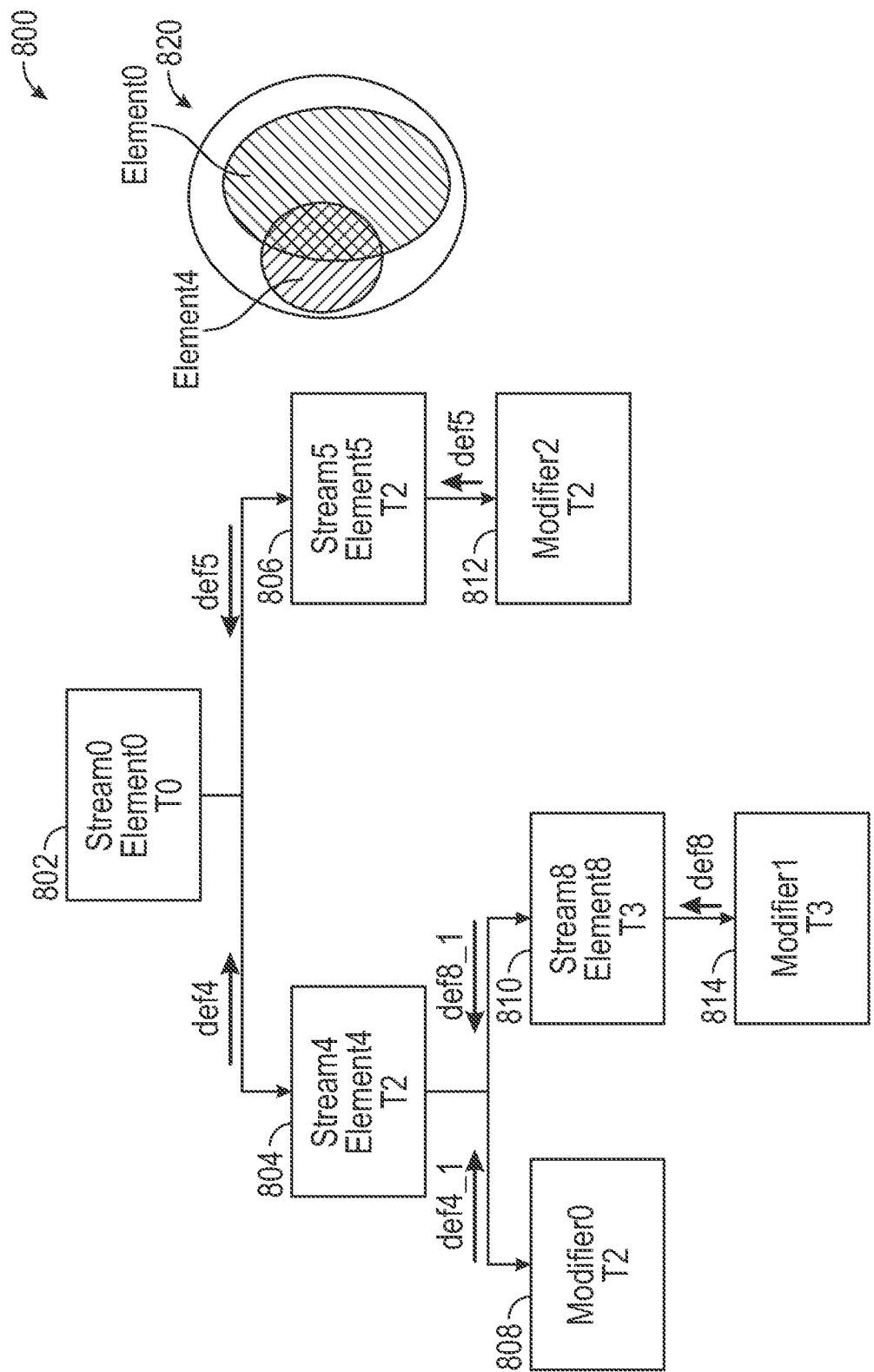
FIG. 8 illustrates exemplary backpropagation of an element structure, according to certain aspects of the present disclosure.

FIG. 8 illustrates exemplary backpropagation of an element structure 800, according to certain aspects of the present disclosure. The element structure 800 may include a hypothetical tree of streams 802, 804, 806, 808, 810, 812, 814 where a top stream 802 (e.g., Stream0) may represent a joint flow of a large data set represented in time by "Element0." A user (e.g., an administrator) may define an update period of the top stream 802 to be T0. At some point in a lower flow, the top stream 802 is split into two smaller and more specific streams 804, 806 (e.g., Stream4 and Stream5), with a new update period T2.

According to aspects, the splitting and changing of update period may proceed until the tree (e.g., the element structure 800) hits its modifier leaves 808, 812, 814. In an implementation, the top level element, Element0, may be split up into subsets, Element4 and Element5, of the data set which, depending on the needs of the flows they feed may overlap 820 and may not completely cover the original data set. According to aspects, the exact structure of the elements may be unknown until backpropagation fills in the details. In an implementation, the elements of the streams 802, 804, 806, 808, 810, 812, 814 may be derived from their parent stream elements.

According to aspects, an element size may be backpropagated up the data management tree 800. The backpropagation may group the elements into collections which are assigned to elements further up the tree 800. At some point the collection may be consumed by a modifier and therefore terminated in the tree 800. Regarding FIG. 8, it may be assumed that this has not happened until at least Element0. For example, a collection may include a conceptual grouping of elements into an element of a stream that exposes a common path through the tree 800 for this element collection. In an implementation, the tool (e.g., the toolchain 404) may find, via backpropagation, that Stream0 is a stream of elements that are of the collective form:

$$\text{Element0} = \{def4, def5, \text{other\_stuff}\}$$

$$\{def4\_1, def8\_1, def5, \text{other\_stuff}\}$$

$$\{def4\_1, def8, def5, \text{other\_stuff}\}$$

According to aspects, the elements are pushed up the tree 800 as either definitions from the leaf or observations. If pushed up as observations, they can share data with other observations in the tree, as shown in the exemplary Venn diagram 820 for Element0 and Element4. If they are pushed up the tree 800 as definitions, they cannot share data further up the tree 800. For example, the use of immutable streams allows the user to formally check that data is not accidentally written twice from any point in a complex program.

According to aspects, it may be assumed that the period of all the streams 802, 804, 806, 808, 810, 812, 814 is the same (e.g., T0==T1==T2==T3). If the period changes then a single stream element will be combined as it moves up the tree 800, or may also be split. In an implementation, it may be assumed that periods increase as they move up the tree 800. Therefore, S=T0/T2 elements of Stream5 will be combined into a collection to represent def5 that is sent to Element0 for further combination with def4. As a result, backpropagation produces a space-time collection of the smallest elements in the top level stream, such as those that are actually operated on by the lowest modifiers. According to aspects, modifiers that are higher up the tree structure 800 may be presented with a 2D collection of elements as their element and may react properly. In an implementation, cross-checks may be utilized to appropriately define the expected collections seen at each modifier.

According to aspects, the tool may organize these data collections into appropriate groups for the target hardware. For example, Modifier0 may define a data set def4_1, which may be a partial definition of Element4 that this modifier is accessing. Modifier1 may define data set def8, which may define Element8. Element8 may then be observed by two streams split into def8_1 and def8_2. For example, def8_1 may be utilized along with def4_1 to define the data set Element4. Additionally, Element4 and Element5 may be utilized to define Element0. Backpropagation may also be utilized to recover from errors. For example, the IR may be backpropagated to recover information in the elements that may have been lost/not processed due to errors.

Figure 9A:
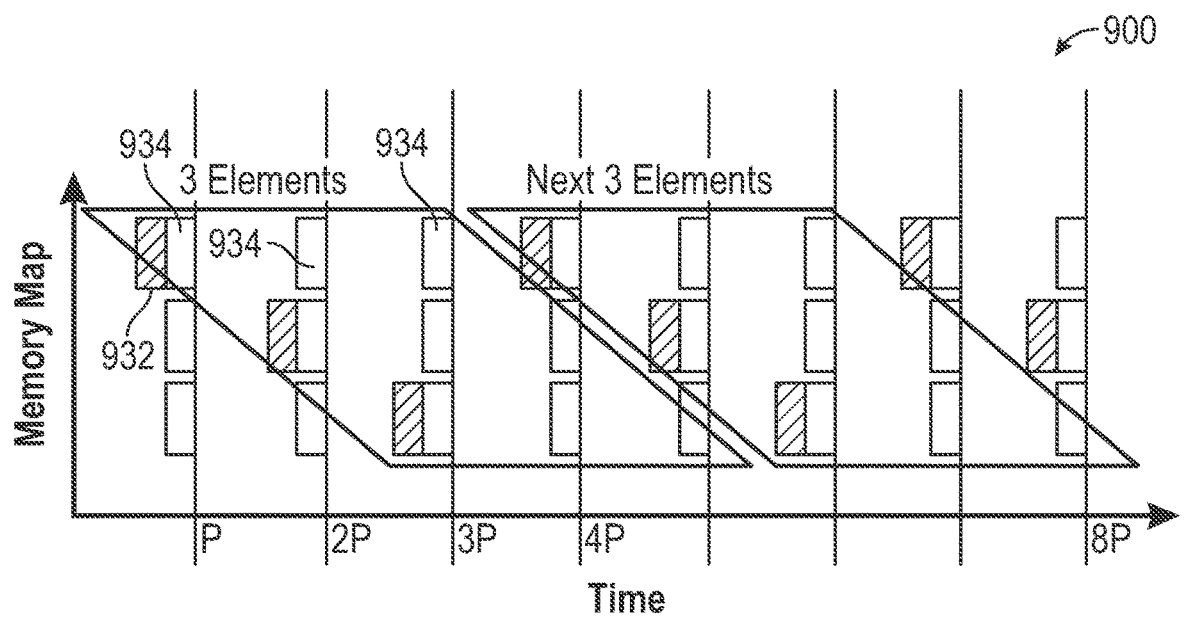
FIGS. 9A and 9B illustrate exemplary memory maps for storage of data streams for a RAN domain specific language, according to certain aspects of the present disclosure.
Figure 9B:
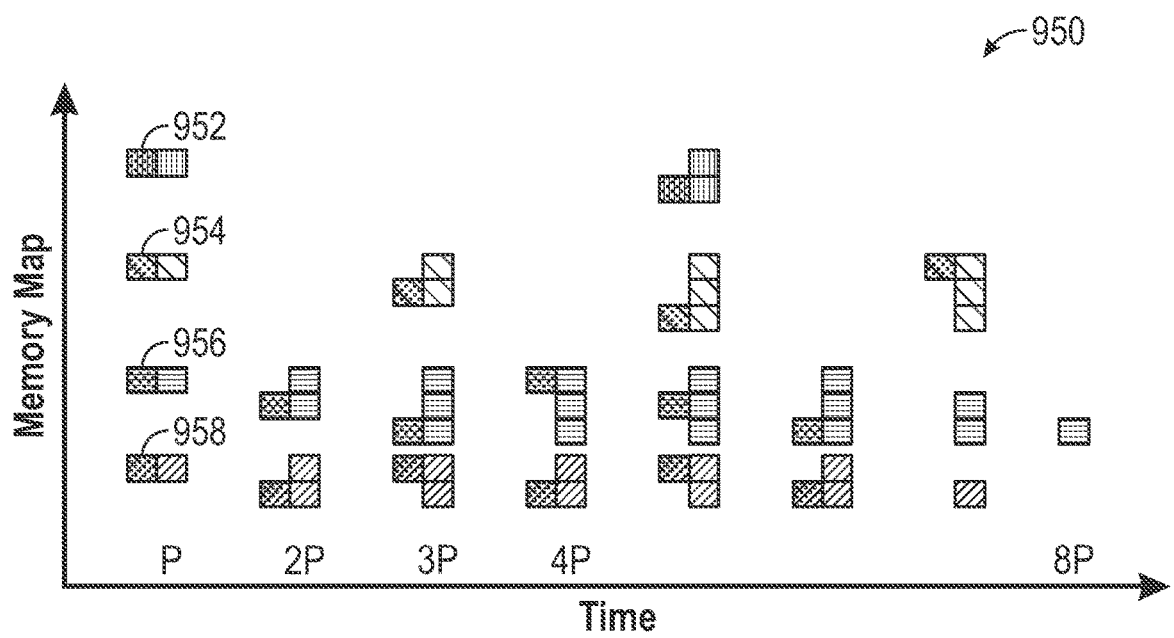

FIGS. 9A and 9B illustrate exemplary memory maps 900, 950 for storage of data streams for a RAN domain specific language, according to certain aspects of the present disclosure. For example, memory requirements implied by the above-described streams may be mapped into flows and mapped as intermediate representations (IR). Each stream may include different periodicities and different active region sizes. Additionally, each stream may include an element size.

According to aspects, their active region may include their "read from storage" and "return to storage" time in their pattern. Each stream may also include a number of periods active value due to access from modifiers with a period offset. As a result, a particular element may become active multiple (e.g., known and fixed) times before retiring. In an implementation, the definition region and the observation region may be obtained via hatching for a single element.

Referring to FIG. 9A, a memory map 900 is shown. According to aspects, an element 932 may be created at P and then accessed three times (e.g., at P, 2P, and 3P). For example, FIG. 9A illustrates a life of one stream having a period of P and activity repetition of 3. As illustrated, with a repetition factor of 3, the memory map 900 may be reused after 3 elements.

Referring to FIG. 9B, another memory map 950 is illustrated. For example, multiple elements 952, 954, 956, 958 may be created at P and then accessed multiple times depending on a period of each.

Figure 10:
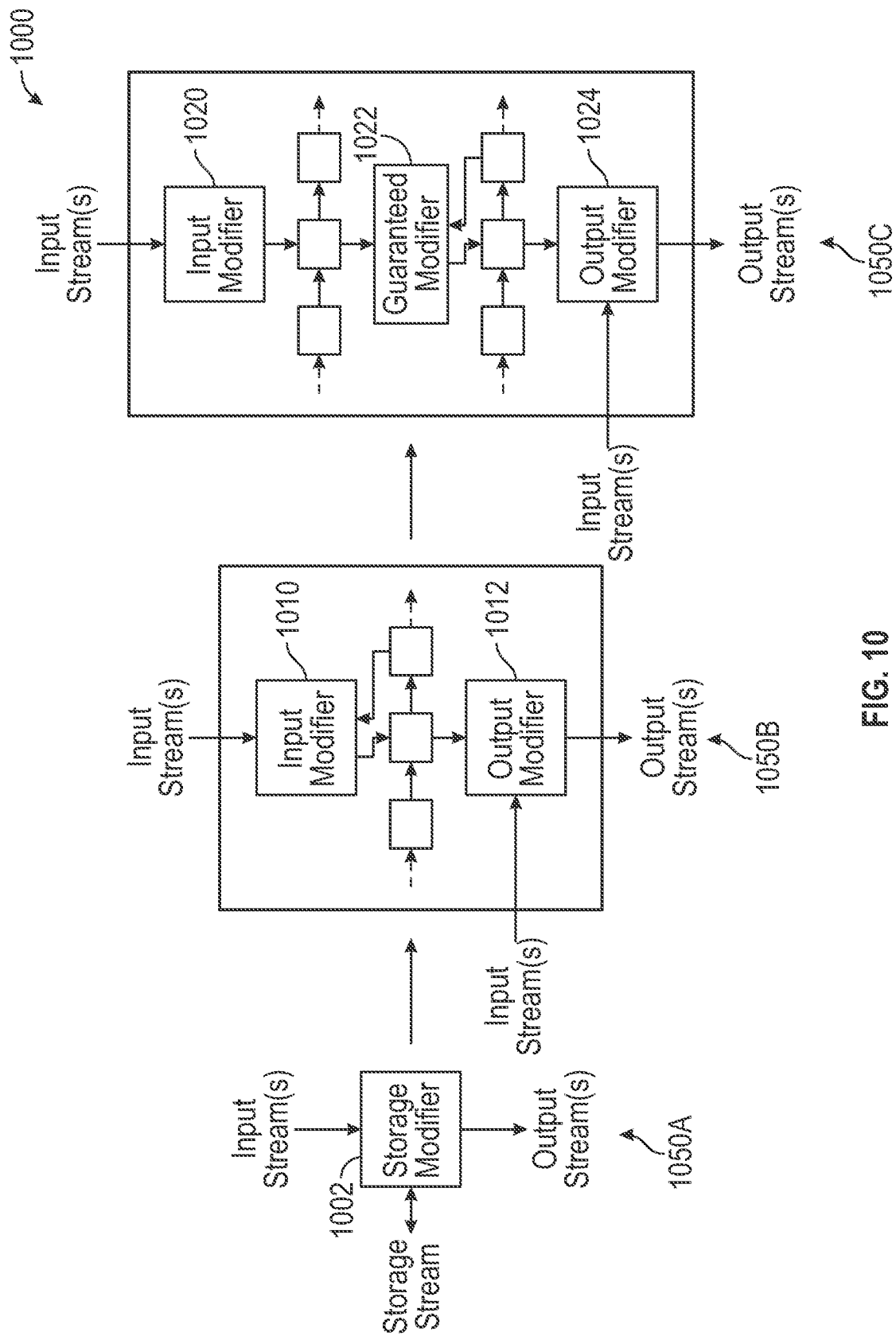
FIG. 10 illustrates an exemplary storage flow, according to certain aspects of the present disclosure.

FIG. 10 illustrates an exemplary storage flow 1000, according to certain aspects of the present disclosure. As described above, a stream is an immutable object, and each element has an active window during which time it can be observed or defined. Outside of this window it does not exist to the program. Therefore storage is represented by feedback from a stream to a modifier that updates the stream. This feedback may occur in many ways and therefore may be defined by a programmer in many ways.

According to aspects, a first block 1050A may include a storage modifier 1002, a second block 1050B may include a breakdown of this storage into a general stream format. For example the second block 1050B may include an input modifier 1010 and an output modifier 1012. According to aspects, the second block 1050B may allow multiple sources to request unordered access during a single active observation period, the result to be applied logically instantaneously during the definition phase. After this update the observation phase allows for multiple read requests to the storage.

According to aspects, if a storage update is missed due to real time constraints, then all of the data in this storage may be lost. As a result, some part of the input modifier may be marked as "unmissable" so that it will be guaranteed to perform an update. A third block 1050C includes a guarantee modifier 1022 to ensure that the input modifier will not be missed. The third block 1050C may also include an input modifier 1020 and an output modifier 1024.

Figure 11:
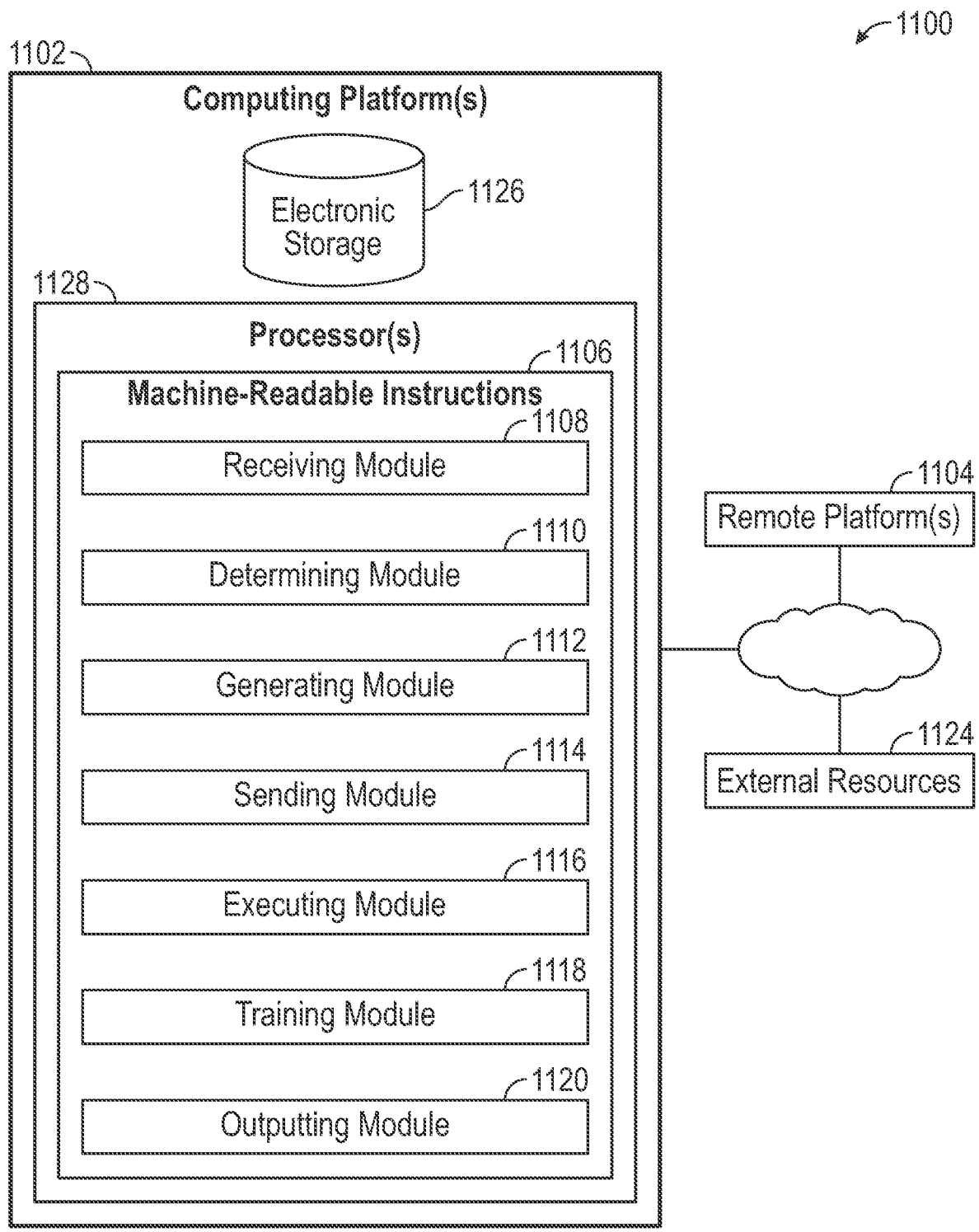
FIG. 11 illustrates a system configured for cross-platform programmable network communication, in accordance with one or more implementations.

FIG. 11 illustrates a system 1100 configured for cross-platform programmable network communication, in accordance with one or more implementations. In some implementations, system 1100 may include one or more computing platforms 1102. Computing platform(s) 1102 may be configured to communicate with one or more remote platforms 1104 according to a client/server architecture, a peer-to-peer architecture, and/or other architectures. Remote platform(s) 1104 may be configured to communicate with other remote platforms via computing platform(s) 1102 and/or according to a client/server architecture, a peer-to-peer architecture, and/or other architectures. Users may access system 1100 via remote platform(s) 1104.

Computing platform(s) 1102 may be configured by machine-readable instructions 1106. Machine-readable instructions 1106 may include one or more instruction modules. The instruction modules may include computer program modules. The instruction modules may include one or more of receiving module 1108, determining module 1110, generating module 1112, sending module 1114, executing module 1116, training module 1118, and/or outputting module 1120, and/or other instruction modules.

Receiving module 1108 may be configured to receive, at a network toolchain, instructions for network hardware of a radio access network (RAN).

Determining module 1110 may be configured to determine, through the network toolchain, an architectural model for the network hardware. The architectural model may include network patterns of the network hardware.

Generating module 1112 may be configured to generating, by the network toolchain, translated instructions based on the instructions, the translated instructions comprising a domain specific language for the RAN.

Sending module 1114 may be configured to sending the translated instructions to the network hardware.

Executing module 1116 may be configured to executing the translated instructions by the network hardware.

Training module 1118 may be configured to train an AI/ML algorithm to learn patterns of network hardware.

Outputting module 1120 may be configured to output results of a network function based on execution of the translated instructions.

In some implementations, computing platform(s) 1102, remote platform(s) 1104, and/or external resources 1124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1102, remote platform(s) 1104, and/or external resources 1124 may be operatively linked via some other communication media.

A given remote platform 1104 may include one or more processors configured to execute computer program modules. The computer program modules may be configured to enable an expert or user associated with the given remote platform 1104 to interface with system 1100 and/or external resources 1124, and/or provide other functionality attributed herein to remote platform(s) 1104. By way of non-limiting example, a given remote platform 1104 and/or a given computing platform 1102 may include one or more of a server, a desktop computer, a laptop computer, a handheld computer, a tablet computing platform, a NetBook, a Smartphone, a gaming console, and/or other computing platforms.

External resources 1124 may include sources of information outside of system 1100, external entities participating with system 1100, and/or other resources. In some implementations, some or all of the functionality attributed herein to external resources 1124 may be provided by resources included in system 1100.

Computing platform(s) 1102 may include electronic storage 1126, one or more processors 1128, and/or other components. Computing platform(s) 1102 may include communication lines, or ports to enable the exchange of information with a network and/or other computing platforms. Illustration of computing platform(s) 1102 in FIG. 11 is not intended to be limiting. Computing platform(s) 1102 may include a plurality of hardware, software, and/or firmware components operating together to provide the functionality attributed herein to computing platform(s) 1102. For example, computing platform(s) 1102 may be implemented by a cloud of computing platforms operating together as computing platform(s) 1102.

Electronic storage 1126 may comprise non-transitory storage media that electronically stores information. The electronic storage media of electronic storage 1126 may include one or both of system storage that is provided integrally (i.e., substantially non-removable) with computing platform(s) 1102 and/or removable storage that is removably connectable to computing platform(s) 1102 via, for example, a port (e.g., a USB port, a firewire port, etc.) or a drive (e.g., a disk drive, etc.). Electronic storage 1126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1126 may include one or more virtual storage resources (e.g., cloud storage, a virtual private network, and/or other virtual storage resources). Electronic storage 1126 may store software algorithms, information determined by processor(s) 1128, information received from computing platform(s) 1102, information received from remote platform(s) 1104, and/or other information that enables computing platform(s) 1102 to function as described herein.

Processor(s) 1128 may be configured to provide information processing capabilities in computing platform(s) 1102. As such, processor(s) 1128 may include one or more of a digital processor, an analog processor, a digital circuit designed to process information, an analog circuit designed to process information, a state machine, and/or other mechanisms for electronically processing information. Although processor(s) 1128 is shown in FIG. 11 as a single entity, this is for illustrative purposes only. In some implementations, processor(s) 1128 may include a plurality of processing units. These processing units may be physically located within the same device, or processor(s) 1128 may represent processing functionality of a plurality of devices operating in coordination. Processor(s) 1128 may be configured to execute modules 1108, 1110, 1112, 1114, 1116, 1118, and/or 1120, and/or other modules. Processor(s) 1128 may be configured to execute modules 1108, 1110, 1112, 1114, 1116, 1118, and/or 1120, and/or other modules by software, hardware, firmware, some combination of software, hardware, and/or firmware, and/or other mechanisms for configuring processing capabilities on processor(s) 1128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1108, 1110, 1112, 1114, 1116, 1118, and/or 1120 are illustrated in FIG. 11 as being implemented within a single processing unit, in implementations in which processor(s) 1128 includes multiple processing units, one or more of modules 1108, 1110, 1112, 1114, 1116, 1118, and/or 1120 may be implemented remotely from the other modules. The description of the functionality provided by the different modules 1108, 1110, 1112, 1114, 1116, 1118, and/or 1120 described below is for illustrative purposes, and is not intended to be limiting, as any of modules 1108, 1110, 1112, 1114, 1116, 1118, and/or 1120 may provide more or less functionality than is described. For example, one or more of modules 1108, 1110, 1112, 1114, 1116, 1118, and/or 1120 may be eliminated, and some or all of its functionality may be provided by other ones of modules 1108, 1110, 1112, 1114, 1116, 1118, and/or 1120. As another example, processor(s) 1128 may be configured to execute one or more additional modules that may perform some or all of the functionality attributed below to one of modules 1108, 1110, 1112, 1114, 1116, 1118, and/or 1120.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 12:
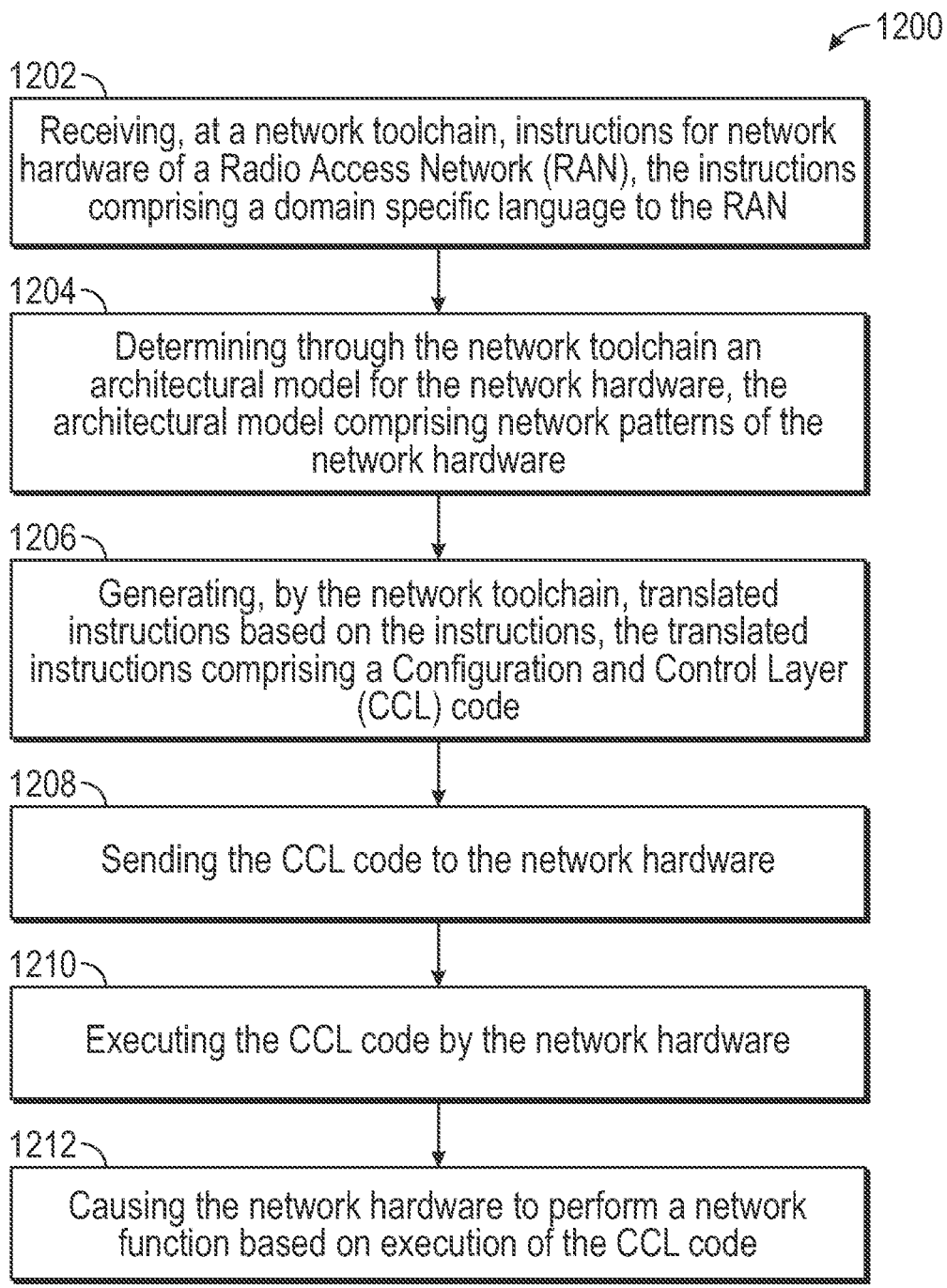
FIG. 12 illustrates an example flow diagram for cross-platform programmable network communication, according to certain aspects of the present disclosure.

FIG. 12 illustrates an example flow diagram (e.g., process 1200) for cross-platform programmable network communication, according to certain aspects of the disclosure. For explanatory purposes, the example process 1200 is described herein with reference to FIGS. 1-4. Further for explanatory purposes, the steps of the example process 1200 are described herein as occurring in serial, or linearly. However, multiple instances of the example process 1200 may occur in parallel. For purposes of explanation of the subject technology, the process 1200 will be discussed in reference to FIGS. 1-4.

At step 1202, instructions are received, at a network toolchain, for network hardware of a radio access network (RAN). The instructions may include a domain specific programming language for the RAN.

At step 1204, an architectural model is determined through the network toolchain for the network hardware. The architectural model may include network patterns of the network hardware.

At step 1206, translated instructions are generated, by the network toolchain, based on the instructions. The translated instructions may include a configuration and control layer (CCL) code.

At step 1208, the CCL code is sent to the network hardware via a service abstraction boundary.

At step 1210, the CCL code is executed by the network hardware.

At step 1212, the network hardware is caused to perform a network function based on execution of the CCL code.

For example, as described above in relation to FIGS. 1-4, at step 1202, instructions are received (e.g., through processor 204), at a network toolchain (e.g., toolchain 304, 404), for network hardware (e.g., hardware 412) of a radio access network (RAN) (e.g., RAN 120). The instructions may include a domain specific language for the RAN. At step 1204, an architectural model (e.g., real time architecture model 410) is determined through the network toolchain for the network hardware. The architectural model may include network patterns of the network hardware. At step 1206, translated instructions (e.g., R-DSL 302, 402) are generated, by the network toolchain, based on the instructions. The translated instructions may include a configuration and control layer (CCL) code. At step 1208, the CCL code is sent to the network hardware. At step 1210, the CCL code is executed by the network hardware. At step 1212, the network hardware is caused to perform a network function based on execution of the CCL code.

According to an aspect, the translated instructions are sent to the network hardware via a RAN service abstraction boundary. For example, the RAN service abstraction boundary may include Layer 1. According to an aspect, the network patterns may include empty elements.

According to an aspect, the domain specific programming language specifies the network function for the network hardware. According to an aspect, the domain specific programming language is hardware agnostic.

According to an aspect, the process 1200 may further include exposing, through a service abstraction boundary, the network patterns for the network hardware.

According to an aspect, the domain specific programming language specifies streams of data.

According to an aspect, a firm real time (FRT) modem may be implemented using a deterministic collection of streams of data accessed by opportunistically scheduled processes. According to an aspect, the elements are all of the same know deterministic size. According to an aspect, each stream adds one new element periodically with a deterministic period defined during configuration or compilation of the modem. Each stream has a deterministic period which may differ from that of other streams.

According to an aspect, the periods are all harmonic multiples of each other. According to an aspect, the streams can be connected to each other and can feed subsets of their elements to other streams. According to an aspect, the data may be defined within a subset of the period called the definition region. According to an aspect, the data may be observed within a subset of the period called the observation region. According to an aspect, if the element is not defined within the definition region, the element will be marked for observation as "empty."

According to an aspect, the streams are managed by a dedicated stream manager (e.g., a dedicated process) which may be a single process or a distributed collection of processes. According to an aspect, the stream manager may be configured using data known at configuration time and compile time to reduce the amount of data required to manage the streams deterministically from the obvious solution.

According to an aspect, each stream may include a maximum range of observation and an element in that stream outside of this range, with respect to the current period, may never be accessed for definition or observation, and may be discarded.

According to an aspect, a number of computational processes run in a manner that cannot impact the deterministic performance of the streams. According to an aspect, the computational processes are scheduled opportunistically using a scheduling strategy.

According to an aspect, a computational process reads a deterministic set of elements from one or more streams and decides how to process them based on the pattern of empty elements. According to an aspect, the process is distributed across multiple hardware elements and may go to sleep between observing elements and between observing and computing and defining elements.

According to an aspect, a domain specific language for real time systems may include flows. Each flow may include streams as input and output, and a defined period of operation. Flows may contain other flows, modifiers, and streams, such that streams connect the flows and modifiers, and also the input and output streams. For example, a child flow may have a different period than its parent flow.

According to an aspect, the streams are immutable and infinite and are made up of elements of data. For example, every element in a stream may include a defined period where it is active and within that period it has a defined region where it can be defined, and a defined period where it can be observed.

According to an aspect, modifiers may contain references to one or more object code that are used to compute new element data based on observed element data.

According to an aspect, an element may include a collection of other elements. For example, a collection may include an unordered group.

According to an aspect, the streams may split into multiple other streams of the same period by dividing up their element collections into multiple smaller elements, which may also be collection subsets of the larger collection.

According to an aspect, streams with different periods may be joined by combining elements in time on the shorter period streams to make collections of elements that can be absorbed in a longer period. In an implementation, a ratio of the periods may include an integer.

According to an aspect, each element may, by default, be flagged as empty and becomes not empty when it is defined using a commit operation from a modifier, or intrinsically from another stream. According to an aspect, an undefined element may be flagged as empty when observed by another stream or modifier.

According to an aspect, only one modifier or stream may define an element in its definition region. For example, it may only do it once. According to an aspect, many modifiers or streams may observe the value of an element in the observation region. For example, it may only be during the observation region.

According to an aspect, modifiers may define actual use of data and provide a maximum runtime estimate for the functional code the modifier is supporting in the R-DSL.

According to an aspect, a compile time and configuration time tool may be utilized to create a flattened graph of elements. According to an aspect, the object code that computes their values may utilize the information gleaned in the modifiers to backtrack specific element size and context back up the graph, so that all element collections are precisely defined. The toolchain may then utilize this information to develop a physical data structure based on the access patterns in the graph.

According to an aspect, there may be assumption logic that defines constraints between parameters in the streams, flows and, modifiers. According to an aspect, the assumption logic defines patterns of empty and not empty on the input streams of a modifier. According to an aspect, the assumption logic chooses what actions to take based on the patterns of empty and not empty on the input streams. According to an aspect, the assumption logic is first order logic.

According to an aspect, data analytics, machine learning, and/or artificial intelligence may be utilized to set some subset of the assumption logic. According to an aspect, the machine intelligence may be utilized to create an intent based system that allows constraints to be set on the modem without complete knowledge of all of the possible constraints. According to an aspect, the intent based system may suggest alternatives if the solution based on the user intent proves to be infeasible.

According to an aspect, the R-DSL may produce an IR that can be mapped to a set of patterns (e.g., the SAB) defined on a modem system using constrained optimization to choose patterns and configure them correctly to fit within the limited resources of the modem.

According to an aspect, the SAB is divided into patterns that manage periodic data movement and definitions that are configured to run statically and deterministically on the modem, and computational functions that generate new data from observed data that are opportunistically scheduled using a scheduling strategy.

According to an aspect, a failure to schedule leads to an empty flag being set so that the next computational function will observe the empty and decide how to proceed. According to an aspect, the toolchain chooses a subset from a superset of patterns based on knowledge of the target SoC.

According to an aspect, a stub modifier may be included that allows code to be written to pick up data from outside of the definition of the R-DSL and place it in a stream and/or allows data in a stream to be placed outside of the definition of the R-DSL.

It is understood that the described systems and methods may be applied to any real time system (RTS), and not just to RANs.

Figure 13:
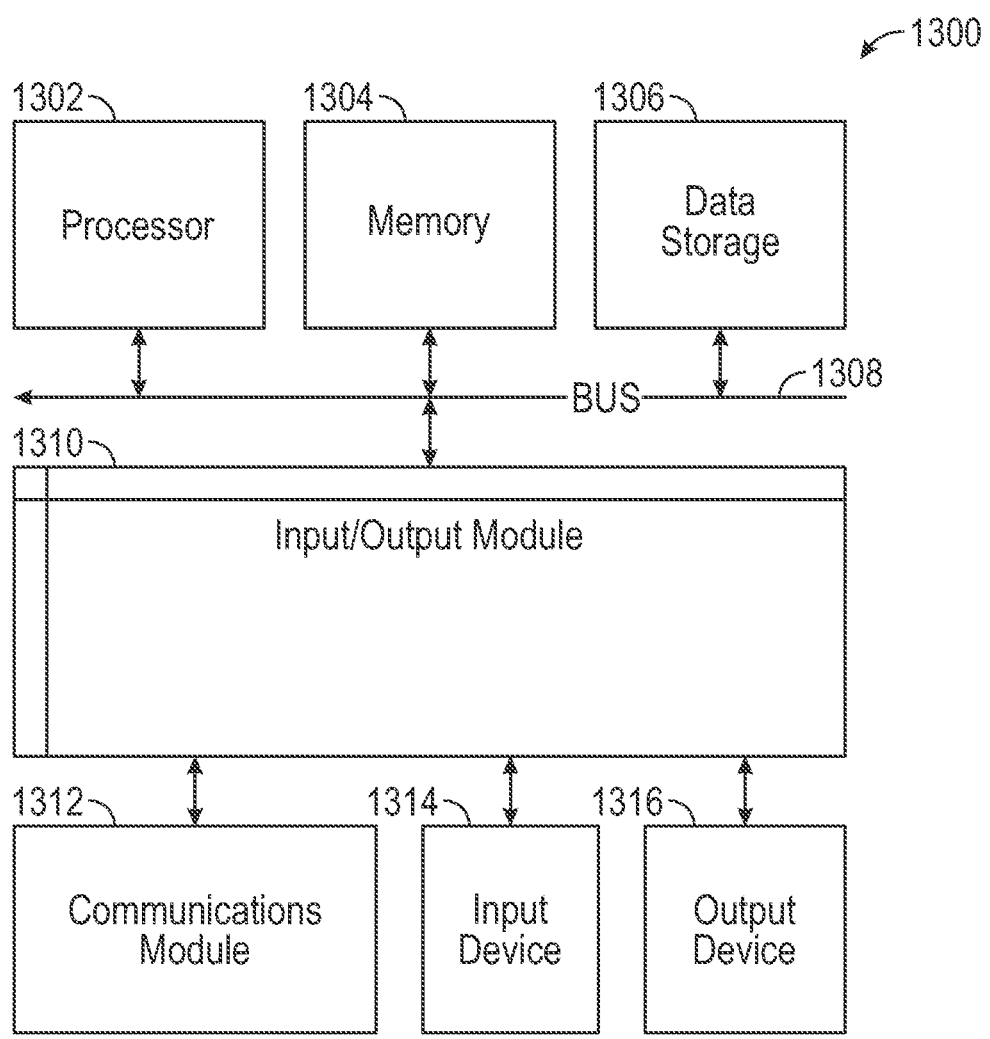
FIG. 13 is a block diagram illustrating an example computer system (e.g., representing both client and server) with which aspects of the subject technology can be implemented.

FIG. 13 is a block diagram illustrating an exemplary computer system 1300 with which aspects of the subject technology can be implemented. In certain aspects, the computer system 1300 may be implemented using hardware or a combination of software and hardware, either in a dedicated server, integrated into another entity, or distributed across multiple entities.

Computer system 1300 (e.g., server and/or client) includes a bus 1308 or other communication mechanism for communicating information, and a processor 1302 coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1300 can include, in addition to hardware, code that creates an execution environment for the computer program in question, e.g., code that constitutes processor firmware, a protocol stack, a database management system, an operating system, or a combination of one or more of them stored in an included memory 1304, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1308 for storing information and instructions to be executed by processor 1302. The processor 1302 and the memory 1304 can be supplemented by, or incorporated in, special purpose logic circuitry.

The instructions may be stored in the memory 1304 and implemented in one or more computer program products, i.e., one or more modules of computer program instructions encoded on a computer-readable medium for execution by, or to control the operation of, the computer system 1300, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1304 may also be used for storing temporary variable or other intermediate information during execution of instructions to be executed by processor 1302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled to bus 1308 for storing information and instructions. Computer system 1300 may be coupled via input/output module 1310 to various devices. The input/output module 1310 can be any input/output module. Exemplary input/output modules 1310 include data ports such as USB ports. The input/output module 1310 is configured to connect to a communications module 1312. Exemplary communications modules 1312 include networking interface cards, such as Ethernet cards and modems. In certain aspects, the input/output module 1310 is configured to connect to a plurality of devices, such as an input device 1314 and/or an output device 1316. Exemplary input devices 1314 include a keyboard and a pointing device, e.g., a mouse or a trackball, by which a user can provide input to the computer system 1300. Other kinds of input devices 1314 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1316 include display devices such as an LCD (liquid crystal display) monitor, for displaying information to the user.

According to one aspect of the present disclosure, the above-described systems can be implemented using a computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in the main memory 1304 causes processor 1302 to perform the process steps described herein. One or more processors in a multi-processing arrangement may also be employed to execute the sequences of instructions contained in memory 1304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, a desktop computer, laptop computer, or tablet computer. Computer system 1300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1302 for execution. Such a medium may take many forms, including, but not limited to, non-volatile media, volatile media, and transmission media. Non-volatile media include, for example, optical or magnetic disks, such as data storage device 1306. Volatile media include dynamic memory, such as memory 1304. Transmission media include coaxial cables, copper wire, and fiber optics, including the wires that comprise bus 1308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1300 reads and processes data, information may be read from the data and stored in a memory device, such as the memory 1304. Additionally, data from the memory 1304 servers accessed via a network, the bus 1308, or the data storage 1306 may be read and loaded into the memory 1304. Although data is described as being found in the memory 1304, it will be understood that data does not have to be stored in the memory 1304 and may be stored in other memory accessible to the processor 1302 or distributed among several media, such as the data storage 1306.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for cross-platform programmable network communication, comprising:
    receiving, at a network toolchain, instructions for network hardware of a radio access network (RAN), the instructions comprising a domain specific language for the RAN;
    determining, through the network toolchain, an architectural model for the network hardware, the architectural model comprising network patterns of the network hardware;
    generating, by the network toolchain, translated instructions based on the instructions, the translated instructions comprising a configuration file;
    sending the configuration file to the network hardware;
    executing the configuration file by the network hardware; and
    causing the network hardware to perform a network function based on execution of the configuration file.

2. The computer-implemented method of claim 1, wherein the configuration file includes a configuration and control layer (CCL) that describes a set of events.

3. The computer-implemented method of claim 1, wherein the network patterns comprise empty elements.

4. The computer-implemented method of claim 1, wherein the domain specific language specifies the network function for the network hardware.

5. The computer-implemented method of claim 1, wherein the network toolchain comprises:
    predicting needs of the network hardware based on observations of the network patterns using artificial intelligence (AI) and/or machine learning (ML) algorithms;
    generating network constraints based on the needs; and
    applying the network constraints to the network hardware.

6. The computer-implemented method of claim 1, further comprising:
    executing a subset of the configuration file based on network patterns observed in the network hardware from performing the network function.

7. The computer-implemented method of claim 1, further comprising:
    exposing, through a service abstraction boundary, the network patterns for the network hardware; and
    transmitting the translated instructions to the network hardware via the service abstraction boundary, the translated instructions being interpretable by code complied to run on the network hardware.

8. The computer-implemented method of claim 1, wherein the domain specific language is hardware agnostic and specifies streams of data.

9. A system for cross-platform programmable network communication, comprising:
 a processor; and
 a memory comprising instructions stored thereon, which when executed by the processor, causes the processor to perform:
  receiving, at a network toolchain, instructions for network hardware of a radio access network (RAN), the instructions comprising a domain specific language for the RAN;
  determining, through the network toolchain, an architectural model for the network hardware, the architectural model comprising network patterns of the network hardware;
  generating, by the network toolchain, translated instructions based on the instructions, the translated instructions comprising a configuration file;
  sending the configuration file to the network hardware;
  executing the configuration file by the network hardware; and
  causing the network hardware to perform a network function based on execution of the configuration file.

10. The system of claim 9, wherein the configuration file includes a configuration and control layer (CCL) that describes a set of events.

11. The system of claim 9, wherein the network patterns comprise empty elements.

12. The system of claim 9, wherein the domain specific language specifies the network function for the network hardware.

13. The system of claim 9, wherein the network toolchain comprises:
 predicting needs of the network hardware based on observations of the network patterns using artificial intelligence (AI) and/or machine learning (ML) algorithms;
 generating network constraints based on the needs; and
 applying the network constraints to the network hardware.

14. The system of claim 9, further comprising stored sequences of instructions, which when executed by the processor, cause the processor to perform:
 executing a subset of the configuration control file based on network patterns observed in the network hardware from performing the network function.

15. The system of claim 9, further comprising stored sequences of instructions, which when executed by the processor, cause the processor to perform:
 exposing, through a service abstraction boundary, the network patterns for the network hardware; and
 transmitting the translated instructions to the network hardware via the service abstraction boundary, the translated instructions being interpretable by code complied to run on the network hardware.

16. The system of claim 9, wherein the domain specific language specifies streams of data.

17. A non-transitory computer-readable storage medium comprising instructions stored thereon, which when executed by one or more processors, cause the one or more processors to perform operations for cross-platform programmable network communication, the operations comprising:
 receiving, at a network toolchain, instructions for network hardware of a radio access network (RAN), the instructions comprising a domain specific language for the RAN;
 determining, through the network toolchain, an architectural model for the network hardware, the architectural model comprising network patterns of the network hardware;
 generating, by the network toolchain, translated instructions based on the instructions, the translated instructions comprising a configuration file;
 sending the configuration file to the network hardware;
 executing the configuration file by the network hardware; and
 causing the network hardware to perform a network function based on execution of the configuration file.

18. The non-transitory computer-readable storage medium of claim 17, wherein the configuration file includes a configuration and control layer (CCL) that describes a set of events.

19. The non-transitory computer-readable storage medium of claim 17, wherein the network patterns comprise empty elements.

20. The non-transitory computer-readable storage medium of claim 17, wherein the domain specific language specifies the network function for the network hardware.

* * * * *

UNITED STATES PATENT AND TRADEMARK OFFICE
CERTIFICATE OF CORRECTION

| | |
|---|---|
| PATENT NO. | : 12,088,451 B2 |
| APPLICATION NO. | : 18/330235 |
| DATED | : September 10, 2024 |
| INVENTOR(S) | : Alan Gatherer, Chaitali Sengupta and Sudipta Sen |

Page 1 of 1

It is certified that error appears in the above-identified patent and that said Letters Patent is hereby corrected as shown below:

In the Claims

Column 31, Claim 14, Line 41, please replace "executing a subset of the configuration control file based" with "executing a subset of the configuration file based".

Signed and Sealed this
Twenty-sixth Day of August, 2025

Coke Morgan Stewart
*Acting Director of the United States Patent and Trademark Office*